US012761321B2

(12) United States Patent
Qu et al.

(10) Patent No.: US 12,761,321 B2
(45) Date of Patent: Oct. 13, 2026

(54) TIME-OF-FLIGHT CAMERA MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Guojian Qu, Beijing (CN); Xiang Li, Beijing (CN); Tanhong Zhao, Beijing (CN); Yawei Chen, Beijing (CN); Gang Li, Beijing (CN); Shaoming Yan, Beijing (CN); Bochang Wang, Beijing (CN); Qiaoke Zhou, Beijing (CN); Liang Bo, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 50 days.

(21) Appl. No.: 17/927,388

(22) PCT Filed: Oct. 26, 2021

(86) PCT No.: PCT/CN2021/126396
§ 371 (c)(1),
(2) Date: Nov. 23, 2022

(87) PCT Pub. No.: WO2023/070313
PCT Pub. Date: May 4, 2023

(65) Prior Publication Data
US 2024/0241224 A1 Jul. 18, 2024

(51) Int. Cl.
*G01S 7/48* (2006.01)
*G01S 7/481* (2006.01)
(Continued)

(52) U.S. Cl.
CPC .............. *G01S 7/4813* (2013.01); *G01S 7/51* (2013.01); *G01S 17/894* (2020.01)

(58) Field of Classification Search
USPC ........................................................ 356/4.01
See application file for complete search history.

(56) References Cited

U.S. PATENT DOCUMENTS 10,303,930 B2 5/2019 Yu et al.
10,481,470 B2 11/2019 Kim et al.
(Continued)

FOREIGN PATENT DOCUMENTS

CN 202632412 U 12/2012
CN 106291574 A 1/2017
(Continued)

OTHER PUBLICATIONS

English Machine Translation of CN 109,737,868 (Year: 2019).*
(Continued)

*Primary Examiner* — James R Hulka
(74) *Attorney, Agent, or Firm* — Dilworth & Barrese, LLP.; Michael J. Musella, Esq.

(57) ABSTRACT

A time-of-flight camera module and a display device are provided. The time-of-flight module includes: a first carrier board, a second carrier board, a structure support, an infrared laser emission unit, a lens and a time-of-flight sensor. The first carrier board, the structure support and the second carrier board are stacked, and the first carrier board and the second carrier board are fixed on both sides of the structure support, respectively. The infrared laser emission unit is arranged on a side of the first carrier board away from the structure support, and the first carrier board includes a lens via hole located on a side of the infrared laser emission unit, the structure support includes a support via hole corresponding to the lens via hole, and the lens passes through the
(Continued)

support via hole. The time-of-flight sensor is arranged on the second carrier board and is configured to sense infrared light collected by the lens to generate depth information.

20 Claims, 10 Drawing Sheets

(51) Int. Cl.
*G01S 7/51* (2006.01)
*G01S 17/894* (2020.01)

(56) References Cited

U.S. PATENT DOCUMENTS

| | | | | |
|---|---|---|---|---|
| 12,034,275 | B2 * | 7/2024 | Gronenborn | H01S 5/18388 |
| 12,075,138 | B2 * | 8/2024 | O | G02B 5/02 |
| 2017/0286756 | A1 * | 10/2017 | Yu | H04N 23/69 |
| 2019/0324351 | A1 * | 10/2019 | Kim | G03B 17/55 |
| 2020/0302147 | A1 | 9/2020 | Gabriele et al. | |
| 2020/0335944 | A1 * | 10/2020 | Gronenborn | H01S 5/18386 |
| 2021/0099618 | A1 | 4/2021 | O | |

FOREIGN PATENT DOCUMENTS

| | | | |
|---|---|---|---|
| CN | 108174075 | A | 6/2018 |
| CN | 207650913 | U | 7/2018 |
| CN | 208014266 | U | 10/2018 |
| CN | 109005348 | A | 12/2018 |
| CN | 109040556 | A | 12/2018 |
| CN | 208225374 | U | 12/2018 |
| CN | 109658841 | A | 4/2019 |
| CN | 109737868 | A | 5/2019 |
| CN | 109901134 | A | 6/2019 |
| CN | 110389357 | A | 10/2019 |
| CN | 110412540 | A | 11/2019 |
| CN | 110568418 | A | 12/2019 |
| CN | 110928046 | A | 3/2020 |
| CN | 111050029 | A | 4/2020 |
| CN | 210400432 | U | 4/2020 |
| CN | 111742455 | A | 10/2020 |
| CN | 111919432 | A | 11/2020 |
| CN | 212992427 | U | 4/2021 |
| CN | 112866575 | A | 5/2021 |
| CN | 113126060 | A | 7/2021 |
| EP | 3735724 | B1 | 10/2022 |
| WO | 2019214973 | A1 | 11/2019 |
| WO | 2020038063 | A1 | 2/2020 |
| WO | 2020038068 | A1 | 2/2020 |
| WO | 2020125388 | A1 | 6/2020 |

OTHER PUBLICATIONS

English Machine Translation of CN 110,568,418 (Year: 2019).*
English Machine Translation of CN 109,901, 134 (Year: 2019).*
International Search Report from International Application No. PCT/CN2021/126396 dated Jul. 21, 2022.

* cited by examiner

TIME-OF-FLIGHT CAMERA MODULE AND DISPLAY DEVICE

This application is a national stage application, filed under 35 U.S.C. § 371, of International Patent Application No. PCT/CN2021/126396, filed on Oct. 26, 2021, which is incorporated by reference herein in its entirety.

TECHNICAL FIELD

The embodiments of the disclosure relate to a time-of-flight camera module and a display device.

BACKGROUND

Time of Flight (ToF) method is a method of calculating a distance by measuring flight time (that is, measuring time required for light from reflection to return). A ToF camera is a camera configured to use the ToF method to capture depth information about an object. According to different measurement principles, the time-of-flight method can be divided into a D-ToF (Direct-ToF) direct measurement and an I-ToF (Indirect-ToF) indirect measurement; among them, the D-ToF direct measurement is to measure a time difference required for light from emission to return, and then multiply the speed of light and divide by 2 to obtain the depth information; the I-ToF indirect measurement is to measure a phase difference between emitted light wave and returned light wave to derive depth information.

Initially, the TOF technology is mainly used in a field of distance measurement, but now with improvement of technical accuracy and improvement of algorithm and computing power such as artificial intelligence, especially improvement of TOF CCD/CMOS chip process, resolution of TOF camera is improved and power consumption is reduced, and more miniaturization and microminiaturization designs have emerged. Now, TOF cameras are widely used on mobile terminals to provide auxiliary imaging for mobile devices such as a mobile phone.

SUMMARY

At least some embodiments of the disclosure provide a time-of-flight camera module. The time-of-flight camera module includes: a first carrier board, a second carrier board, a structure support, an infrared laser emission unit, a lens and a time-of-flight sensor, wherein the first carrier board, the structure support and the second carrier board are stacked, and the first carrier board and the second carrier board are fixed on both sides of the structure support, respectively, the infrared laser emission unit is arranged on a side of the first carrier board away from the structure support, the first carrier board comprises a lens via hole located on a side of the infrared laser emission unit, the structure support comprises a support via hole corresponding to the lens via hole, and the lens passes through the support via hole, the time-of-flight sensor is arranged on the second carrier board and is configured to sense infrared light collected by the lens to generate depth information.

For example, the time-of-flight camera module provided by some embodiments of the disclosure further comprises: a housing, wherein the structure support comprises a plurality of wedges, the housing comprises wedge mounting portions corresponding to the plurality of wedges one to one, and the structure support is fixed to the housing by matching of the plurality of wedges and the plurality of wedge mounting portions.

For example, in the time-of-flight camera module provided by some embodiments of the disclosure, the infrared laser emission unit comprises a first infrared laser emission unit and a second infrared laser emission unit, the first infrared laser emission unit and the second infrared laser emission unit are arranged side by side on the side of the first carrier board away from the structure support, the lens via hole is located on a side of the second infrared laser emission unit away from the first infrared laser emission unit.

For example, in the time-of-flight camera module provided by some embodiments of the disclosure, an orthographic projection of a center of the first infrared laser emission unit on the first carrier board, an orthographic projection of a center of the second infrared laser emission unit on the first carrier board and an orthographic projection of a center of the lens on the first carrier board are located on a same straight line.

For example, the time-of-flight camera module provided by some embodiments of the disclosure further comprises: a front housing, wherein the front housing comprises a front surface, the front surface comprises a first groove and a second groove recessing in a direction towards the structure support; the first groove comprises a first opening corresponding to the first infrared laser emission unit and a second opening corresponding to the second infrared laser emission unit, the second groove comprises a third opening corresponding to the lens; the time-of-flight camera module further comprises a first filter covering the second groove, and the first filter is configured to allow infrared light having wavelength the same as that of infrared light emitted by the first infrared laser emission unit and the second infrared laser emission unit to pass through.

For example, the time-of-flight camera module provided by some embodiments of the disclosure further comprises: a second filter covering the first groove, and the second filter is configured to allow infrared light having wavelength the same as that of infrared light emitted by the first infrared laser emission unit and the second infrared laser emission unit to pass through.

For example, in the time-of-flight camera module provided by some embodiments of the disclosure, a distance between centers of the first infrared laser emission unit and the second infrared laser emission unit is d, a distance from the first infrared laser emission module to the second filter and a distance from the second infrared laser emission unit to the second filter are both h, a horizontal emission angle of the first infrared laser emission unit and a horizontal emission angle of the second infrared laser emission unit are both a, and a vertical emission angle of the first infrared laser emission unit and a vertical emission angle of the second infrared laser emission unit are both b, a size c1 of the first cover plate in a direction parallel to a line connecting centers of the first infrared laser emission unit and the second infrared laser emission unit and a size c2 of the second filter in a direction perpendicular to the line connecting centers of the first infrared laser emission unit and the second infrared laser emission unit satisfy the following formula, respectively:

$$c1 > 2\,h*\tan(a/2)+d,\ c2 > 2\ h*\tan(b/2).$$

For example, the time-of-flight camera module provided by some embodiments of the disclosure further comprises: a connection board, a second flexible circuit board and a cable, wherein the connection board is electrically connected with the first carrier board by the second flexible circuit board, the cable is electrically connected with the connection board, and the cable is configured to be connected with at least one of an external power supply and an external device.

For example, in the time-of-flight camera module provided by some embodiments of the disclosure, the structure support further comprises a fourth opening and a limit ring, the limit ring is located on a side of the structure support away from the first carrier board, the second flexible circuit board bends and passes through the fourth opening and the limit ring.

For example, the time-of-flight camera module provided by some embodiments of the disclosure further comprises: a front housing and a back housing, wherein the back housing comprises a back surface, and is fixed with the front housing by the back surface to achieve a whole machine coverage; the front housing comprises a front surface which is inclined relative to the back surface, and a value range of an inclination angle of the front surface relative to the back surface is [20°, 40°].

For example, the time-of-flight camera module provided by some embodiments of the disclosure further comprises: a back housing and a back housing blocking cover, wherein the back housing comprises a fifth opening, the connection board is fixed to the back housing and corresponds to the fifth opening; the back housing blocking cover is configured to block the fifth opening, the back housing blocking cover is a hollow structure, and the cable passes through the hollow structure to be connected with the connection board.

For example, the time-of-flight camera module provided by some embodiments of the disclosure further comprises: an infrared laser circuit module and a housing, wherein the infrared laser circuit module is arranged on the side of the first carrier board away from the structure support; thermal adhesive is provided on a side of the infrared laser circuit module away from the first carrier board, and is configured to be in contact with the housing, and a material of the housing comprises metal.

For example, the time-of-flight camera module provided by some embodiments of the disclosure further comprises: a first flexible circuit board, wherein the first carrier board and the second carrier board are both printed circuit boards, and the first carrier board is electrically connected with the second carrier board by the first flexible circuit board.

For example, the time-of-flight camera module provided by some embodiments of the disclosure further comprises: a computational component, wherein the computational component is arranged on the first carrier board, the computational component is configured to determine at least one of a number, a distance, a total activity time, and dwelling time of human body in a field of view of the time-of-flight camera module and provide an identification for the human body in the field of view of the time-of-flight camera module according to the depth information.

For example, in the time-of-flight camera module provided by some embodiments of the disclosure, a distance between the centers of the first infrared laser emission unit and the second infrared laser emission unit is in a range from 15 to 30 mm.

For example, in the time-of-flight camera module provided by some embodiments of the disclosure, a distance between the centers of the second infrared laser emission unit and the lens is in a range from 20 to 60 mm.

For example, in the time-of-flight camera module provided by some embodiments of the disclosure, a horizontal field of view of the lens is greater than 100°, and a vertical field of view of the lens is greater than 80°.

For example, in the time-of-flight camera module provided by some embodiments of the disclosure, the first infrared laser emission unit and the second infrared laser emission unit each comprises a vertical cavity surface emitting laser and a beam expander, the vertical cavity surface emitting laser has an emission power in a range from 1 W to 1.4 W, a horizontal emission angle of the vertical cavity surface emitting laser is greater than or equal to 95°, and a vertical emission angle of the vertical cavity surface emitting laser is greater than or equal to 75°, a maximum detection distance of the time-of-flight camera module is in a range from 5 m to 7 m.

For example, in the time-of-flight camera module provided by some embodiments of the disclosure, a mounting height of the time-of-flight camera module is H, a vertical field of view of the lens is $\alpha$, a pitch angle of the lens of the time-of-flight camera module is $\theta$, a detection distance range of the time-of-flight camera module is [L1, L2], a detection height range of the time-of-flight camera module at a detection distance L1 is [h1, h2], and the time-of-flight camera module satisfies the following relationship formula: $\tan(\alpha/2-\theta)*L1+H>h2$, $H-\tan(\alpha/2\div\theta)*L1<h1$.

For example, in the time-of-flight camera module provided by some embodiments of the disclosure, L1 is in a range from 0.3 m to 0.7 m, L2 is in a range from 5 m to 7 m, h1 is in a range from 1 m to 1.2 m, and h2 is in a range from 1.9 m to 2.3 m.

At least some embodiments of the disclosure provide an application method of the time-of-flight camera module according to any of the embodiments as mentioned above. The application method includes: determining a detection distance range [L1, L2] and a detection height range [h1, h2] at a detection distance L1 required by an application scenario; determining a mounting height H of the time-of-flight camera module, a vertical field of view $\alpha$ of the lens and a lens pitch angle $\theta$ of the time-of-flight camera module, according to formulas: $\tan(\alpha/2-\theta)*L1+H>h2$, $H-\tan(\alpha/2+\theta)*L1<h1$; and determining an emission power of the first infrared laser emission unit and the second infrared laser emission unit according to a detection distance L2.

For example, in the application provided by some embodiments of the disclosure, L1 is in a range from 0.3 m to 0.7 m, L2 is in a range from 5 m to 7 m, h1 is in a range from in to 1.2 m, and h2 is in a range from 1.9 m to 2.3 in.

At least some embodiments of the disclosure provide a display device comprising: a device body and the time-of-flight camera module according to any embodiments as mentioned above, wherein the time-of-flight camera module is arranged on a top of the device body, and the device body comprises a display screen.

For example, in the display device provided by some embodiments of the disclosure, the time-of-flight camera module is configured to detect whether a person is in a predetermined detection region, the display screen is configured to display advertising content in the case that no person is in the predetermined detection region, and display product information in the case that a person is in the predetermined detection region.

For example, in the display device provided by some embodiments of the disclosure, the display screen is configured to display advertising content; the time-of-flight camera module is configured to: detect whether there is a person in the predetermined detection region, in the case that a person is in the predetermined detection region, provide an independent identification for each person in the predetermined detection region, track each person, and proceed statistics of dwelling time of each person in the predetermined detection region; and, in the case that the dwelling time is greater than a threshold, increase an advertising reading amount by 1; and in the case that the independent identification disappears and appears repeatedly, proceed no repeated counting for the advertising reading amount.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
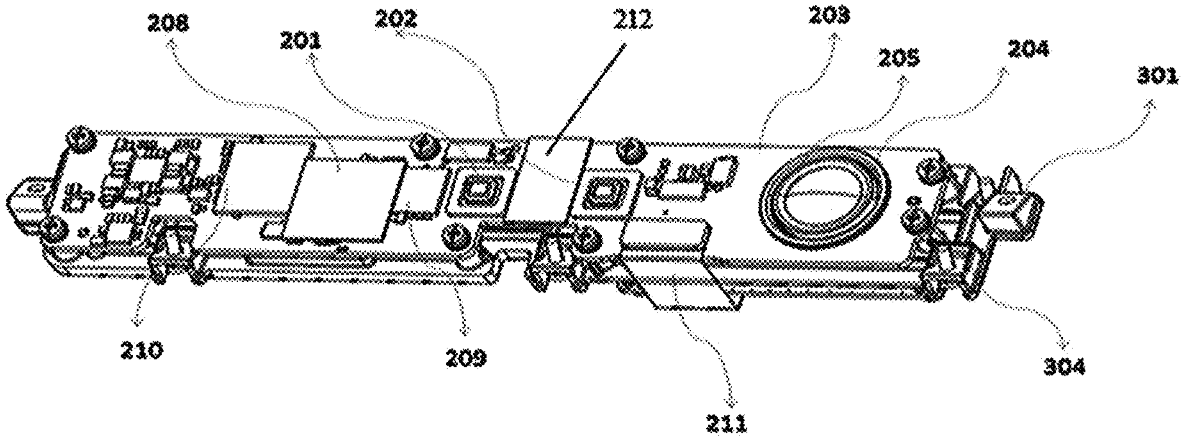
FIG. 1A and FIG. 1B are schematic diagrams of an internal structure of a time-of-flight camera module provided by some embodiments of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terminology or scientific terminology used herein should have the general meanings understood by those skills in the art to which the present invention belongs. The "first", "second" and similar words used in the present invention application specification and claims do not mean any sequence, amount or importance, but are merely used to distinguish different components. Likewise, "a" or "an" or similar words do not mean the limitation to amount, instead, it refers to at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

With development of Internet of Things (IoT) technology, new retail models based on big data and artificial intelligence are gradually emerging around the world. While companies provide digital services to the general population, they further want to be able to access consumer information. For example, by collecting feedback from viewers while playing an advertising, companies can get an effective reading volume of the advertising, so that an advertising strategy can be adjusted to achieve a better commercial layout. Although human body recognition based on face recognition can obtain detailed attributes of a crowd through a camera, this method is bound to bring about personal attribute information records including facial features while obtaining information. In recent years, an issue of privacy leakage has become increasingly concerning. In order to take consideration to a protection of personal privacy, an only solution is not to involve a collection of any personal information at a hardware level.

In recent years, more and more scenarios use 3D depth information for object recognition and behavior detection, and 3D depth cameras are widely used in a field such as machine vision. Common 3D depth cameras include a 3D camera based on binocular stereo vision principle, a 3D camera based on structure light principle, or a 3D camera based on flight time principle. Both of the binocular stereo vision principle and the structure light principle are based on additional projection calculation of RGB/grayscale image to obtain depth information, and a device itself will process high-resolution images in a process of acquiring the depth information, therefore it cannot meet needs of privacy protection. The TOF technology is to directly measure a time/phase difference between emitted light and received light to obtain a point cloud map, and an acquisition of the depth information does not rely on two-dimensional image, therefore it can meet the needs of privacy protection.

At least some embodiments of the present disclosure provide a time-of-flight camera module. The time-of-flight camera module includes: a first carrier board, a second carrier board, a structure support, an infrared laser emission unit, a lens and a time-of-flight sensor; wherein the first carrier board, the structure support and the second carrier board are stacked, and the first carrier board and the second carrier board are fixed on both sides of the structure support, respectively. The infrared laser emission unit is arranged on a side of the first carrier board away from the structure support, the first carrier board comprises a lens via hole located on a side of the infrared laser emission unit, the structure support comprises a support via hole corresponding to the lens via hole, the lens passes through the support via hole, the time-of-flight sensor is arranged on the second carrier board and is configured to sense infrared light collected by the lens to generate depth information.

Some embodiments of the present disclosure further provide an application method and a display device corresponding to the time-of-flight camera module described above.

The time-of-flight camera module provided by the embodiments of the present disclosure, by a design of a triple-layer-stacking structure of the first carrier board, the structure support and the second carrier board, reasonably arranges each component (device) in each camera module, which at the same time is conducive to compactness, stability and heat dissipation of an overall structure.

The following embodiments of the present disclosure are described in detail in conjunction with accompanying drawings. It should be noted that, in order to maintain clarity and brevity of description of the present disclosed embodiments, detailed description of known functions and known parts (elements) may be omitted. In the case that any one of parts (elements) of the embodiments of the present disclosure appears in more than one of the drawings, the part (element) in each drawing is represented by the same or similar reference number.

Figure 1B:
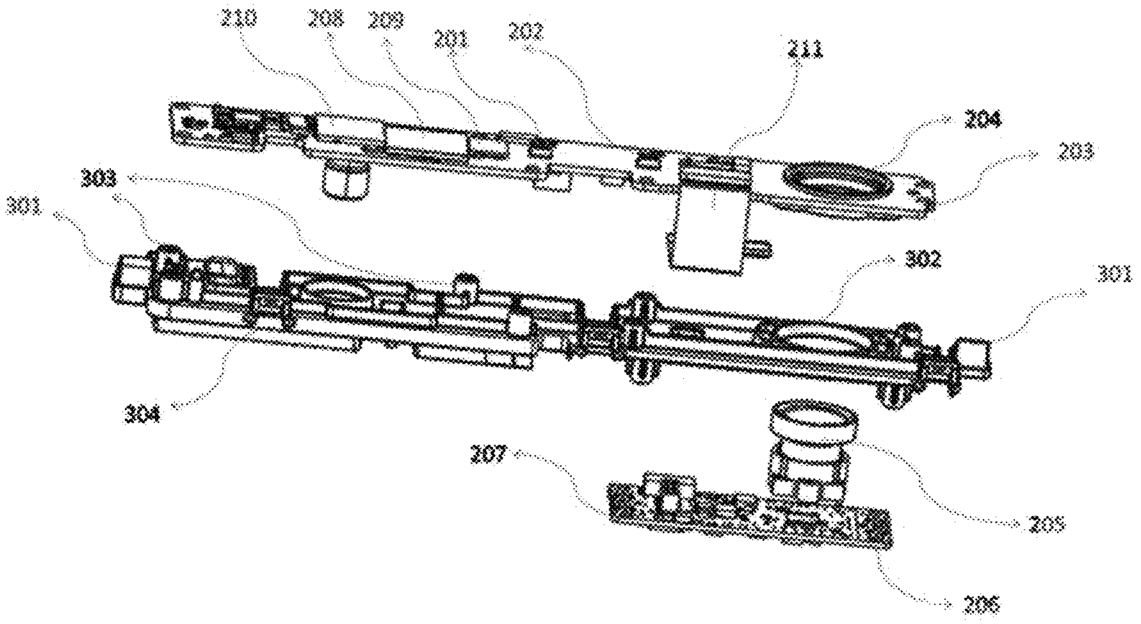
Figure 1C:
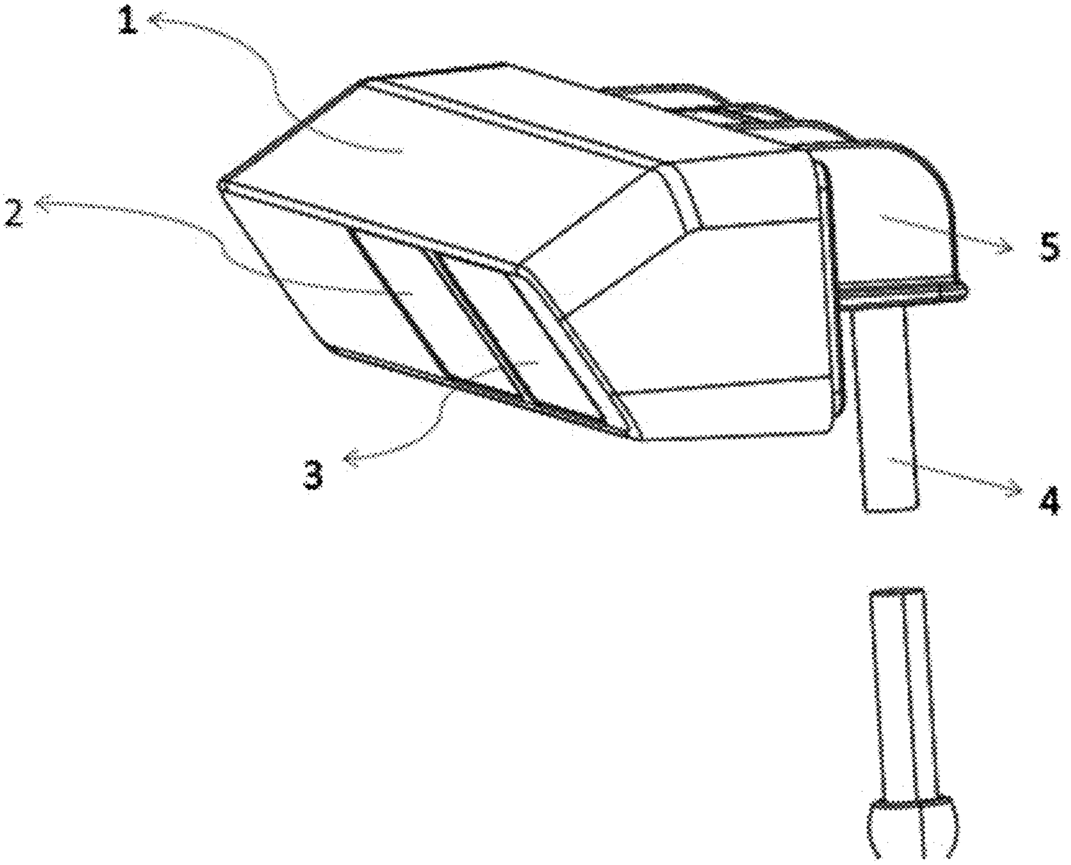
FIG. 1C and FIG. 1D are schematic diagrams of an external structure of a time-of-flight camera module provided by some embodiments of the present disclosure.
Figure 1D:
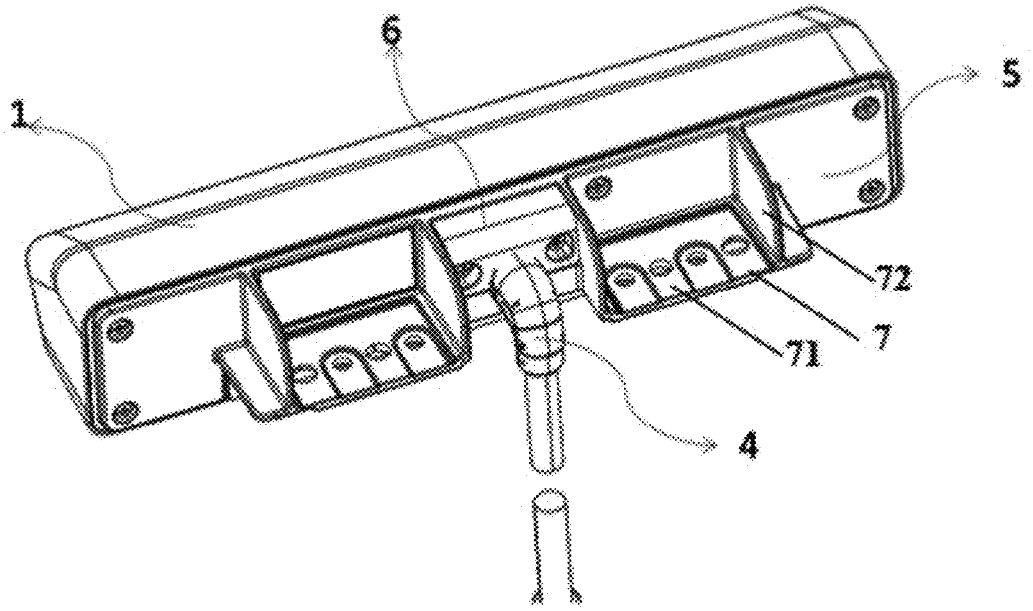
Figure 1E:
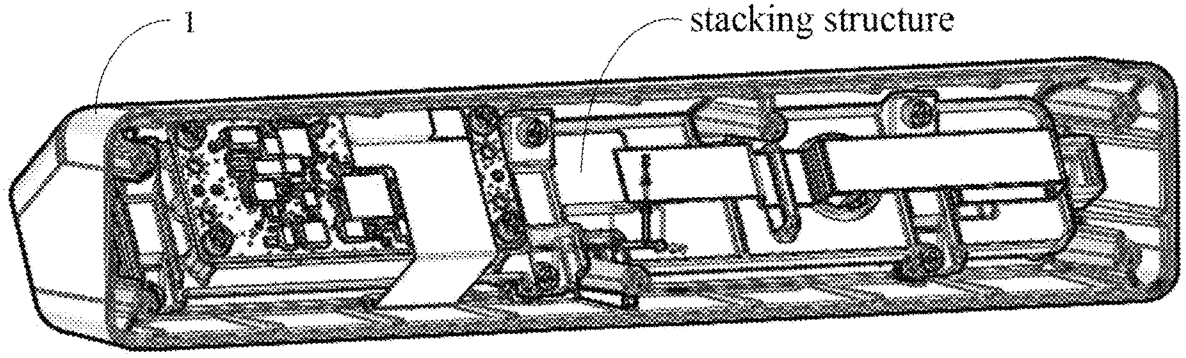
FIG. 1E is a schematic diagram of a mounting structure of a front housing of a time-of-flight camera module provided by some embodiments of the present disclosure.
Figure 1F:
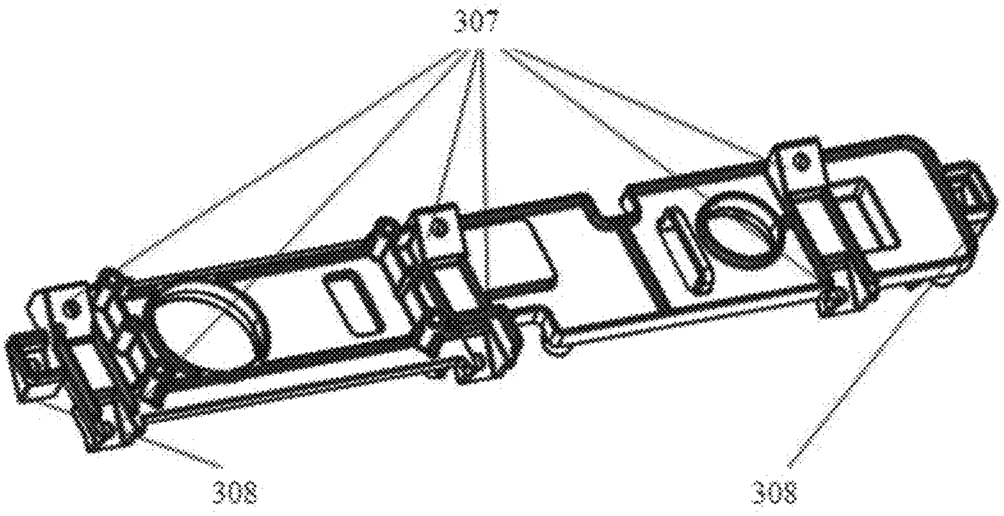
FIG. 1F is a schematic diagram of a structure support of a time-of-flight camera module provided by some embodiments of the present disclosure.
Figure 1G:
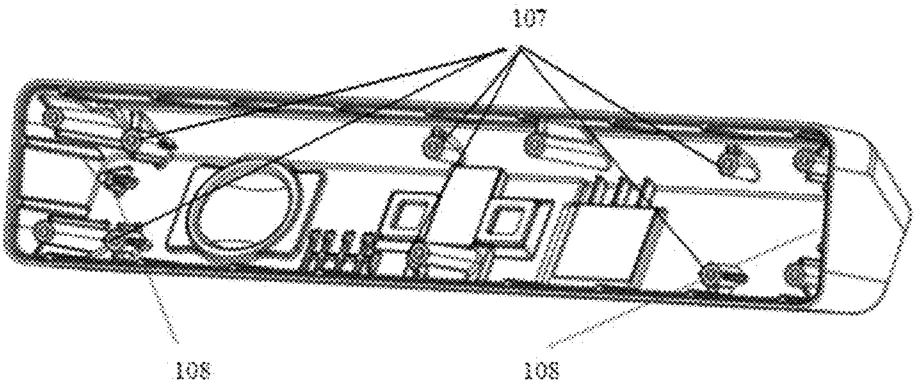
FIG. 1G is a schematic diagram of an internal structure of a front housing of a time-of-flight camera module provided by some embodiments of the present disclosure.
Figure 1H:
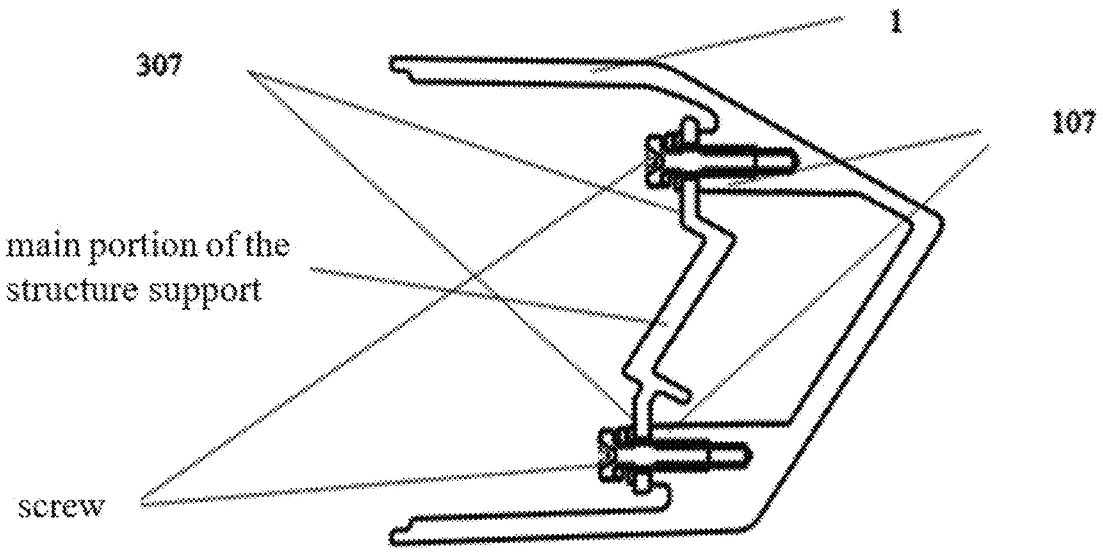
FIG. 1H is a side view of a mounting structure of a front housing of a time-of-flight camera module provided by some embodiments of the present disclosure.
Figure 1I:
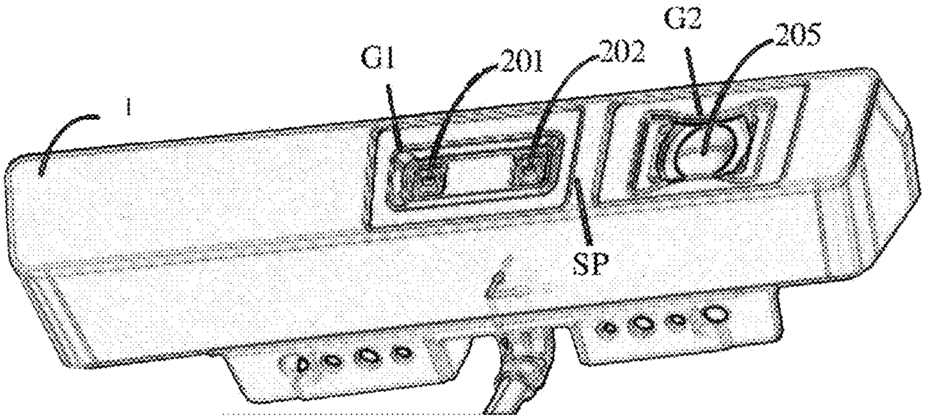
FIG. 1I is a schematic diagram of a front surface of a front housing of a time-of-flight camera module provided by some embodiments of the present disclosure.
Figure 1J:
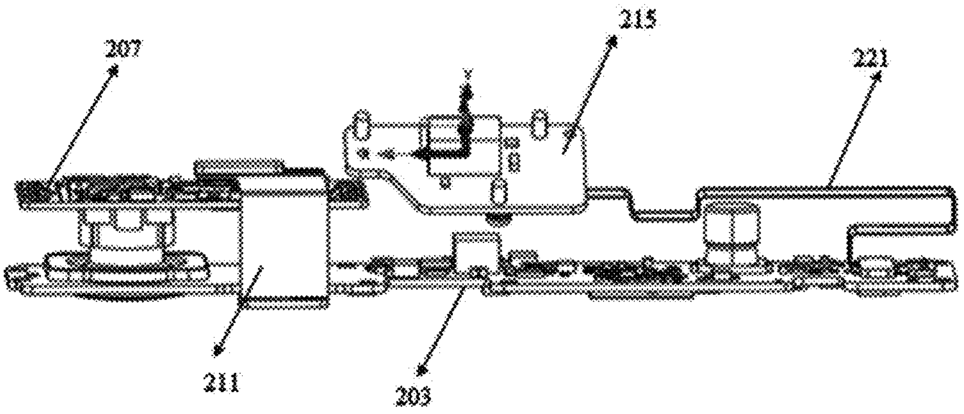
FIG. 1J is a schematic diagram of an internal structure of another time-of-flight camera module provided by some embodiments of the present disclosure.
Figure 1K:
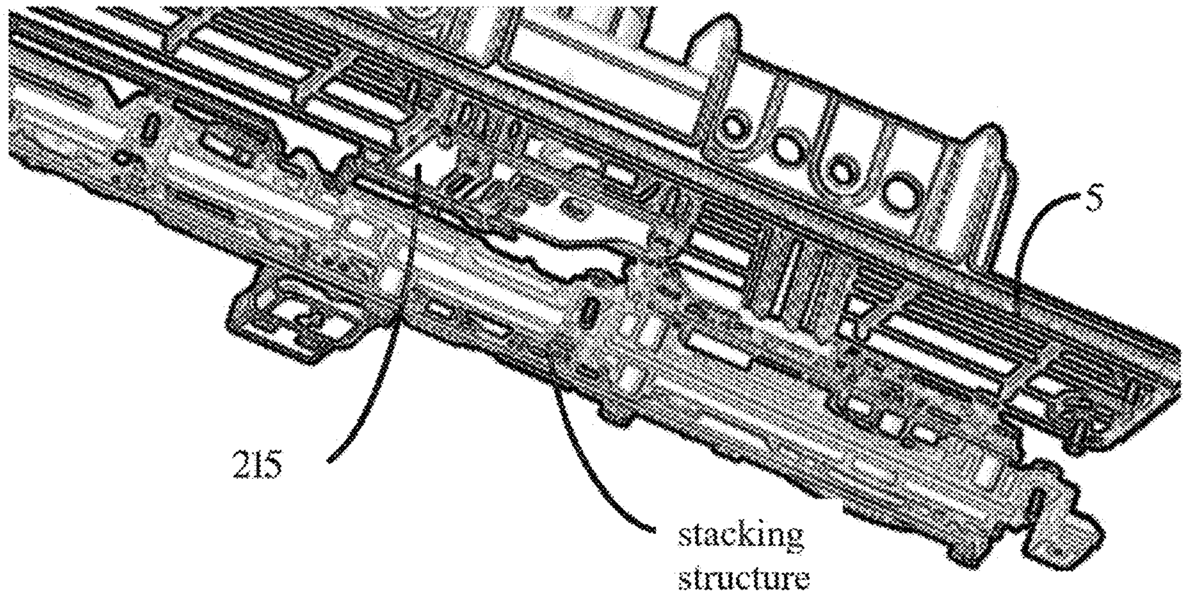
FIG. 1K is a schematic diagram of a mounting structure of a back housing of a time-of-flight camera module provided by some embodiments of the present disclosure.
Figure 1L:
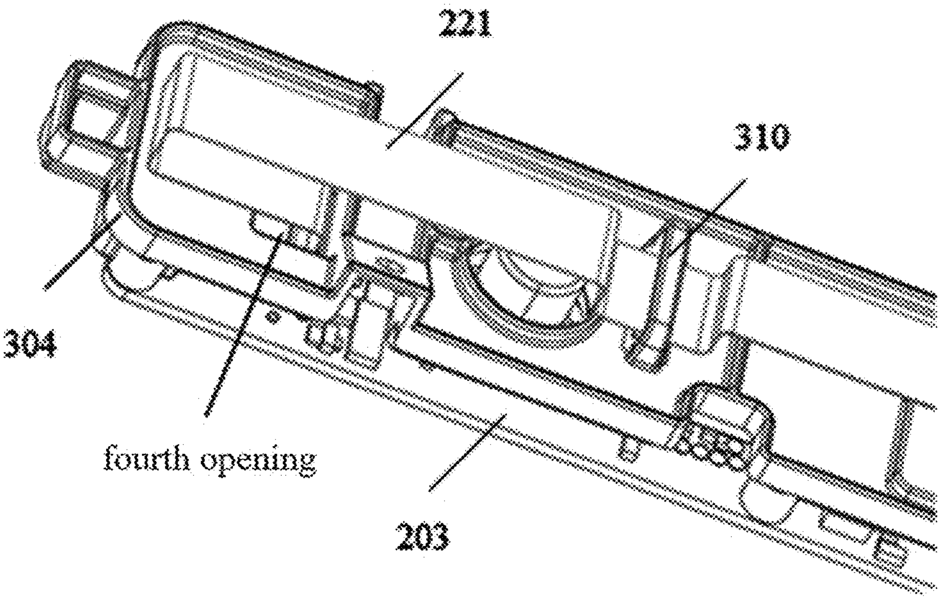
FIG. 1L is a schematic diagram of a mounting structure of a second flexible circuit board of a time-of-flight camera module provided by some embodiments of the present disclosure.
Figure 1M:
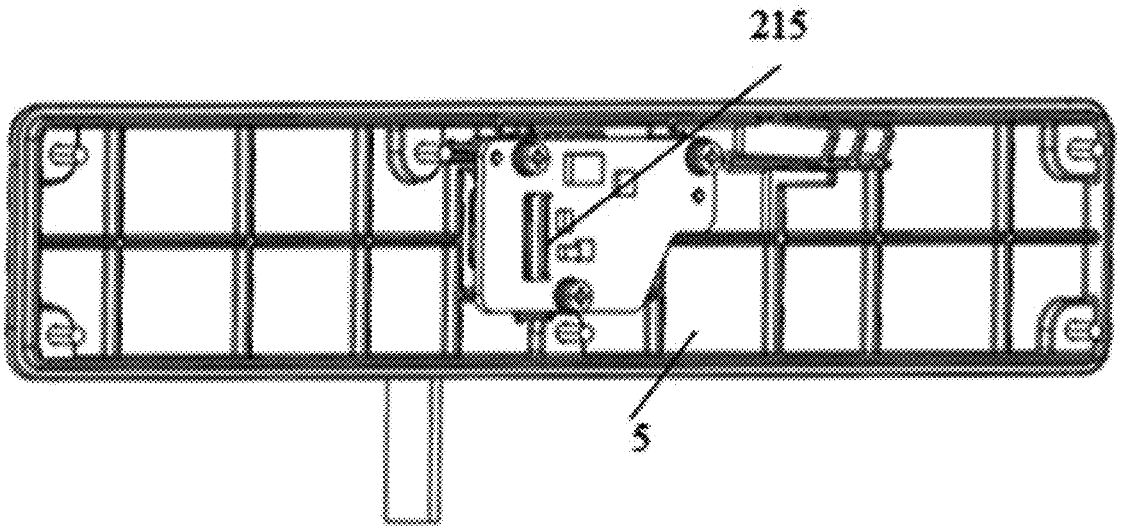
FIG. 1M is a schematic diagram of a mounting structure of a connection board of a time-of-flight camera module provided by some embodiments of the present disclosure.
Figure 2A:
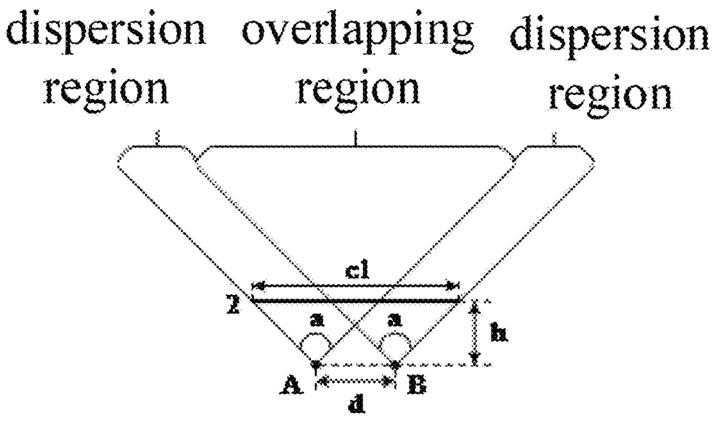
FIG. 2A and FIG. 2B are schematic diagrams of a size setting of a first cover board in a time-of-flight camera module provided by some embodiments of the present disclosure.
Figure 2B:
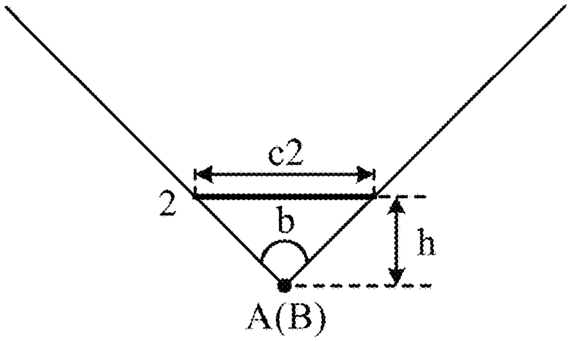

FIG. 1A and FIG. 1B are schematic diagrams of an internal structure of a time-of-flight camera module provided by some embodiments of the present disclosure; FIG. 1C and FIG. 1D are schematic diagrams of an external structure of a time-of-flight camera module provided by some embodiments of the present disclosure; FIG. 1E is a schematic diagram of a mounting structure of a front housing of a time-of-flight camera module provided by some embodiments of the present disclosure; FIG. 1F is a schematic diagram of a structure support of a time-of-flight camera module provided by some embodiments of the present disclosure; FIG. 1G is a schematic diagram of an internal structure of a front housing of a time-of-flight camera module provided by some embodiments of the present disclosure; FIG. 1H is a side view of a mounting structure of a front housing of a time-of-flight camera module provided by some embodiments of the present disclosure; FIG. 1I is a schematic diagram of a front surface of a front housing of a time-of-flight camera module provided by some embodiments of the present disclosure; FIG. 1J is a schematic diagram of an internal structure of another time-of-flight camera module provided by some embodiments of the present disclosure; FIG. 1K is a schematic diagram of a mounting structure of a back housing of a time-of-flight camera module provided by some embodiments of the present disclosure; FIG. 1L is a schematic diagram of a mounting structure of a second flexible circuit board of a time-of-flight camera module provided by some embodiments of the present disclosure; FIG. 1M is a schematic diagram of a mounting structure of a connection board of a time-of-flight camera module provided by some embodiments of the present disclosure; FIG. 2A and FIG. 2B are schematic diagrams of a size setting of a first cover board in a time-of-flight camera module provided by some embodiments of the present disclosure.

For example, as shown in FIG. 1A and FIG. 1B, the time-of-flight camera module comprises a first carrier board 203, a second carrier board 207, a structural support 304, an infrared laser emission unit (201 and 202), a lens 205, and a time-of-flight sensor 206.

For example, as shown in FIG. 1A and FIG. 1B, the first carrier board 203, the structure support 304 and the second carrier board 207 are stacked, and the first carrier board 203 and the second carrier board 207 are fixed on both sides of the structure support 304, respectively. For example, in some examples, the first carrier board 203 may be fixed with the structure support 304 by a plurality of (for example, 8, but not limited to this) screw hole positions 303; similarly, the second carrier board may further be fixed with the structure support 304 by a plurality of (for example, 8, but not limited to this) screw hole positions 303. It should be noted that embodiments of the present disclosure include, but are not limited to this.

For example, as shown in FIG. 1A and FIG. 1B, the infrared laser emission unit (201 and 202) is arranged on a side of the first carrier board 203 away from the structure support 304, the first carrier board comprises a lens via hole 204 located on a side of the infrared laser emission unit (201 and 202). For example, a number of the infrared laser emission unit may be one or more, and embodiments of the present disclosure include but are not limited to this. For example, as shown in FIG. 1A and FIG. 1B, the infrared laser emission unit may include a first infrared laser emission unit 201 and a second infrared laser emission unit 202. It should be noted that, although embodiments of the present disclosure take two infrared laser emission units (for example, the first infrared laser emission unit 201 and the second infrared laser emission unit 202) as examples to be illustrated, but this should not be regarded as a limitation of the present disclosure. In practical applications, the number of the infrared laser emission unit can be set according to actual needs.

For example, as shown in FIG. 1A and FIG. 1B, the first infrared laser emission unit 201 and the second infrared laser emission unit 202 are arranged side by side on the first carrier board 203, and are arranged on the side away from the structure support 304. The first carrier board 203 includes a lens via hole 204 located on a side of the second infrared laser emission unit 202 away from the first infrared laser emission unit 201. The structure support 304 comprises a support via hole 302 corresponding to the lens via hole 204, the lens 205 passes through the support via hole 302. For example, the lens 205 may be fixed by the lens via hole 204 and/or the support via hole 302, and embodiments of the present disclosure include but are not limited to this. For example, in some examples, the lens 205 may be fixed to the lens via hole 204 by a lens rubber ring, thereby achieving fixation, cushioning, dustproof and reducing interference light for the lens 205.

For example, in some examples, an orthographic projection of a center of the first infrared laser emission unit 201 on the first carrier board 203, an orthographic projection of a center of the second infrared laser emission unit 202 on the first carrier board 203 and an orthographic projection of a center of the lens 205 (for example, a center of the lens via hole 204) on the first carrier board 203 are located on the same straight line, so that a laser coverage of the first infrared laser emission unit 201 and the second infrared laser emission unit 202 overlaps or roughly overlaps with a field of view of the lens 205, which is beneficial to meet requirements of ultra-wide angle and long distance-range detection. It should be noted that the orthographic projections of the three on the first carrier board 203 being located on the same straight line include that the orthographic projection of the center of one of them on the first carrier board 203 is slightly deviated from the straight line on which the orthographic projections of centers of the other two on the first carrier board 203 are located. In the case that a distance between the orthographic projection of the center of one of them on the first carrier board 203 and the straight line on which the orthographic projections of the centers of the other two on the first carrier board 203 are located is less than or equal to 10 mm, it may be considered that the orthographic projection of the center of the first infrared laser emission unit 201 on the first carrier board 203, the orthographic projection of the center of the second infrared laser emission unit 202 on the first carrier board 203 and the orthographic projection of the center of the lens 205 (that is, the center of the lens via hole 204) on the first carrier board 203 are located on the same straight line.

For example, as shown in FIG. 1A and FIG. 1B, the time-of-flight sensor (ToF Sensor) 206 is arranged on the second carrier board 207, and is configured to sense infrared light collected by the lens 205 to generate depth information. For example, in some examples, the time-of-flight sensor 206 may sense infrared light collected by the lens 205 (for example, the infrared light is emitted by the first infrared laser emission unit 201 and the second infrared laser emission unit 202, reflected by an external object, filtered by an infrared filter and collected by the lens), measure time of the infrared light travelling from the emission part of the infrared laser emission unit (that is, the first infrared laser emission unit 201 and the second infrared laser emission unit 202) to the sensing unit (for example, the sensing unit of the time-of-flight sensor 206 is arranged on a side of the second carrier board 207 close to the structure support 304), and at the same time, record infrared grayscale image of a photographed object. The infrared filter only allows the infrared light emitted by the emission part with corresponding wavelength to pass through, and filters out optical interference of infrared light with other wavelengths. It should be noted that embodiments of the present disclosure include but are not limited to this. For example, in other examples, the time-of-flight sensor 206 may measure a phase difference between the emitted light wave and the returned light wave to derive depth information. For example, the time-of-flight sensor 206 includes a CCD/CMOS chip for sensing infrared light and the like. It should be understood that, in order to meet needs of medium and long distance detection, a high-resolution sensor with high QE values (for example, TOF CCD of 640*480 pixels) can be chosen for the time-of-flight sensor.

For example, the time-of-flight camera module may further include a computational component. For example, as shown in FIG. 1A and FIG. 1B, the computational component includes a System on Chip (SoC, further known as a "system-on-chip", for example, a vision processor) 208, a random memory (for example, a DDR chip), a flash memory chip, and the like. For example, as shown in FIG. 1A and FIG. 1B, the computational component is arranged on the first carrier board 203. For example, as shown in FIG. 1A and FIG. 18, the computational component may be located on a side of the first infrared laser emission unit 201 away from the second infrared laser emission unit 202, and the embodiments of the present disclosure include but are not limited to this. The computational component is configured to determine at least one of a number, a distance, a total activity time, dwelling time of human body in a field of view of the time-of-flight camera module, and provide an identification (ID) for the human body in the field of view of the time-of-flight camera module according to the depth information generated by the time-of-flight sensor 206. In the embodiments of the present disclosure, the computational component and the time-of-flight sensor 206 are located on different carrier boards, which facilitates heat dissipation of the internal structure of the time-of-flight camera module.

For example, as shown in FIG. 1A and FIG. 1B, the time-of-flight camera module may further include a first flexible circuit board 211. For example, the first carrier board 203 and the second carrier board 207 are both printed circuit boards, and the first carrier board 203 is electrically connected with the second carrier board 207 by the first flexible circuit board 211. For example, as shown in FIG. 1B and FIG. 1J, both sides of the first flexible circuit board 211 may be lapped with the first carrier board 203 and the second carrier board 207, respectively, and the first flexible circuit board 211 may bend around the structure support 304 between the first carrier board 203 and the second carrier board 207.

That is, in the time-of-flight camera module provided in the embodiments of the present disclosure, the emission unit (for example, the first infrared laser emission unit 201 and the second infrared laser emission unit 202) and the sensing unit (for example, time-of-flight sensor 206) are integrated on two different printed circuit boards. By stacking an upper layer and a lower layer of the printed circuit board, and providing the lens via hole 204 for mounting the lens 205 in the upper layer of the printed circuit board (i.e., the first carrier board 203, accordingly, the lower layer of the printed circuit board is the second carrier board 205), thickness of the internal structure of the time-of-flight camera module can be reduced, which at the same time is conducive to the compactness of the overall structure of the time-of-flight camera module. In addition, the structure support 304 is provided between the upper layer and the lower layer of the printed circuit boards to lock the upper layer and the lower layer of the printed circuit boards, which is conducive to the stability of the internal structure of the time-of-flight camera module.

For example, as shown in FIG. 1C and FIG. 1E, the time-of-flight camera module may further include a housing. For example, the housing may include a front housing 1 and a back housing 5, and the front housing 1 is matched with the back housing 5 together to achieve a whole machine covering. For example, the structure support 304 may include a plurality of wedges, the housing may include a plurality of wedge mounting portions corresponding to the plurality of wedges one to one, and the structure support 304 is fixed to the housing by matching of the plurality of wedges and the plurality of wedge mounting portions. Hereinafter, the structural support 304 being fixed to the front housing 1 is as an example to be illustrated, but should not be regarded as a limitation on the embodiments of the present disclosure.

For example, as shown in FIG. 1E and FIG. 1G, the front housing 1 includes an accommodation cavity for accommodating a stacking structure formed by the first carrier board 203, the structure support 304 and the second carrier board 207. For example, as shown in FIG. 1F, the structure support 304 may include a plurality of wedges (for example, a fixing wedge 307 and an alignment wedge 308 shown in FIG. 1F), and each wedge has a via hole therein. Exemplarily, FIG. 1F shows three pairs of fixing wedges 307 and one pair of alignment wedges 308, and embodiments of the present disclosure include but are not limited to this. For example, as shown in FIG. 1G, the front housing 1 includes wedge mounting portions corresponding to the plurality of wedges one to one (for example, wedge fixing screw hole 107 and wedge alignment portion 108 shown in FIG. 1G). Exemplarily, three pairs of wedge fixing screw holes 107 and one pair of wedge alignment portions 108 are shown in FIG. 1G (the wedge alignment portion 108 on the right is obscured, so only its position is indicated, and its specific structure is not shown in FIG. 1G), which respectively correspond to three pairs of fixed wedges 307 and one pair of alignment wedge 308 in FIG. 1F. Embodiments of the present disclosure include, but are not limited to this. For example, as shown in FIG. 1H, the structure support 304 may be fixed to the front housing 1 by a screw, the fixing wedge 307 and the wedge fixing screw hole 107; a main portion of the structure support can be set obliquely, by adjusting an angle between the main portion of the structure support and a main portion of the fixing wedge (for example, the main portion of the fixing wedge 307 is a part of the fixing wedge 307 in contact with the wedge fixing screw hole 107), an inclination angle of the main portion of the structure support can be adjusted, so that a lens pitch angle of the time-of-flight camera module can be quickly adjusted to adapt to different scenarios. For example, the structure support 304 may be aligned and matched with the front housing 1 by the alignment wedge 308 and the wedge alignment portion 108 to facilitate assembly and fixation. For example, as shown in FIG. 1G, the wedge alignment portion 108 may be a columnar structure, in the case that the alignment wedge 308 is aligned with the wedge alignment portion 108, the columnar structure may pass through a via hole in the alignment wedge 308, thereby achieving an alignment and matching. Embodiments of the present disclosure do not limit a specific shape and structure of the columnar structure, as long as the columnar structure can match with the via hole in the alignment wedge 308.

For example, in some examples, as shown in FIG. 1F, the fixing wedges 307 may be arranged on an upper side and a lower side of the structure support 304 (the upper side and the lower side of the structure support 304 are parallel or roughly parallel to a line connecting the centers of the first infrared laser emission unit 201 and the second infrared laser emission unit 202), and the alignment wedge 308 may be arranged on a left side and a right side of the structure support 304 (the left side and the right side of the structure support 304 are vertical or roughly perpendicular to the line connecting the centers of the first infrared laser emission unit 201 and the second infrared laser emission unit 202), embodiments of the present disclosure include but are not limited to this. It should be appreciated that, in some embodiments, the alignment wedge 308 on the structure support 304 and the wedge alignment portion 108 on the front housing 1 may be omitted. For example, in some embodiments, the fixing wedges 307 may be arranged on the left side and the right side of the structure support 304, and the wedge fixing screw holes 107 are provided at the corresponding position of the front housing 1 to achieve the fixation between the structure support 304 and the front housing 1, so that a detection range in a horizontal direction of the lens of the time-of-flight camera module can be quickly adjusted to adapt to different scenarios. It should be noted that the number of the fixing wedges 307 and the alignment wedges 308 in FIG. 1F and the number of the wedge fixing screw holes 107 and the wedge alignment portions 108 in FIG. 1G are exemplary, and embodiments of the present disclosure are not limited to this.

For example, as shown in FIG. 1C, the front housing 1 may include a front surface (for example, a surface where a filter 2 and a filter 3 are located). For example, the front surface may be perpendicular to a stacking direction of the first carrier board 203, the structure support 304 and the second carrier board 207 (for example, the front surface is parallel to a surface where the first carrier board 203 is located and a surface where the second carrier board 207 is located), but is not limited to this. For example, the front surface is parallel to a surface of the filter 2 and/or a surface of the filter 3.

For example, as shown in FIG. 1I, the front surface of the front housing 1 comprises a first groove G1 and a second groove G2 concaving in a direction towards the structure support 304. For example, an isolation portion SP is provided between the first groove G1 and the second groove G2. The first groove G1 includes a first opening corresponding to the first infrared laser emission unit 201 and a second opening corresponding to the second infrared laser emission unit 202, the first opening is configured to expose the emission part of the first infrared laser emission unit 201, the second opening is configured to expose the emission part of the second infrared laser emission unit 202; the second groove G2 includes a third opening corresponding to the lens 205, and the third opening is configured to expose the lens 205. For example, at least a part of the first groove G1 is bowl-shaped and inwardly recessed (for example, recessed to the inside of the housing), thereby facilitating direct emission of the infrared light emitted by the emission part of the first infrared laser emission unit 201 and the emission part of the second infrared laser emission unit 202. For example, the second groove G2 is also recessed inward. The isolation portion SP can prevent interference caused by that the infrared light emitted by the emission part of the infrared laser emission unit directly enters the lens 205 through internal reflection, refraction, or scattering and so on (that is, the infrared light is not reflected by a target object in an external environment). In some embodiments, the first opening and the second opening may also be the same opening, which is configured to expose the emission part of the first infrared laser emission unit 201 and the emission part of the second infrared laser emission unit 202. It should be noted that in the case that the number of the infrared laser emission units is not two, it is possible to provide grooves and openings according to an actual number.

For example, as shown in FIG. 1C, the time-of-flight camera module further comprises a filter 3 (in the present disclosure, further referred to as a "first filter") which allows infrared light having wavelength the same as that of the infrared light emitted by the first infrared laser emission unit

201 and the second infrared laser emission unit 202 to pass through. The filter 3 covers the second groove G2 to act as a seal. For example, in some examples, the filter 3 may be an infrared filter to reduce interference of ambient light or others. For example, the filter 3 may include a transparent substrate (for example, PMMA substrate, but is not limited to this) and an infrared coating, and embodiments of the present disclosure include but are not limited to this. For example, the filter 3 allows infrared light to pass through and prevents light transmission in other bands. For example, the filter 3 may be a band-pass filter, such as a narrow-band filter, but is not limited to this. Taking a center wavelength of the infrared light emitted by the first infrared laser emission unit 201 and the second infrared laser emission unit 202 being 850 nm as an example, the filter 3 may be a narrow-band filter. For example, in one particular example, a transmittance of the narrow-band filter for infrared light with a wavelength between 840 nm and 880 nm is not less than 90%, and for infrared light with a wavelength less than 830 nm and infrared light with a wavelength greater than 890 nm are both close to 0.

For example, as shown in FIG. 1C, the time-of-flight camera module further comprises a filter (in the present disclosure, further referred to as a "second filter") 2 which allows the infrared light emitted by the first infrared laser emission unit 201 and the infrared light emitted by the second infrared laser emission unit 202 to pass through. The filter 2 covers the first groove G1 to act as a seal. For example, in some examples, the filter 2 may further be an infrared filter to improve monochromatic properties of infrared light emitted by the first infrared laser emission unit 201 and the second infrared laser emission unit 202, eliminate stray light, and reduce interference of ambient light or others. For example, the filter 2 allows infrared light to pass through and prevents light transmission in other bands. For example, material and type of the filter 2 and the filter 3 may be the same, specific details can refer to relevant description of filter 3 above, and will not be repeated herein.

For example, as shown in FIG. JA, the time-of-flight camera module may further include an infrared laser circuit module 212; for example, the infrared laser circuit module 212 may provide power supply for the infrared laser emission unit or be configured to control the infrared laser emission unit. For example, as shown in FIG. 1A, the infrared laser circuit module 212 is arranged on the side of the first carrier board 203 away from the structure support 304. For example, the infrared laser circuit module 212 is close to the infrared laser emission unit; for example, as shown in FIG. 1A, the infrared laser circuit module 212 is located between the first infrared laser emission unit 201 and the second infrared laser emission unit 202. For example, the infrared laser circuit module 212 is coated with a thermal adhesive on a side away from the first carrier board 203, the thermal adhesive is configured to be in contact with the housing (for example, the front housing 1). For example, in the case that the structure support 304 is fixed to the front housing 1, the thermal adhesive is in contact with the front housing 1. For example, material of the housing (for example, front housing 1) may be metal, including but is not limited to aluminum, aluminum alloy and so on.

For example, as shown in FIG. 1C and FIG. 1D, the time-of-flight camera module may further include a back housing 5. The back housing includes a back surface, and the back housing 5 is fixed with the front housing 1 by the back surface to achieve the whole machine coverage. For example, the back surface is a plane where the main structure of the back housing is located; for example, the back housing can be projected from all directions, wherein a projection direction in which back housing has a maximum projection area is perpendicular to the back surface. For example, as shown in FIG. 1C and FIG. 1D, the front surface is inclined relative to the back surface. For example, in some examples, a value range of an inclination angle of the front surface relative to the back surface is [20°, 40°], so that the time-of-flight camera module is available for a variety of common human body detection application scenarios after being mounted, but is not limited to this. Of course, in some embodiments, the front surface may further be parallel to the back surface. For example, in some examples, the value range of the inclination angle of the front surface relative to the back surface is [0°, 40°], but is not limited to this. For example, in some examples, a plurality of screw grooves may be reserved in the front housing 1, and a plurality of screw holes corresponding to the plurality of screw grooves may be reserved in the back surface of the back housing 5, so that the front housing 1 and the back housing 5 may be integrally mounted by a plurality of screws. It should be noted that as mounting the time-of-flight camera module, the back surface is usually perpendicular to the ground. Taking a direction perpendicular to the ground as a vertical direction, the back surface is parallel to the vertical direction; accordingly, the stacking structure formed by the first carrier board 203, the structure support 304 and the second carrier board 207 is inclined relative to the vertical direction. It should be understood that, in practical applications, an inclination angle of the stacking structure relative to the vertical direction mentioned above (for example, a pitch angle of the stacking structure mentioned above) can be adjusted by adjusting the wedge angle 301 mentioned above. Of course, the pitch angle of the front surface and the pitch angle of the stacking structure mentioned above may be consistent, so that the plane the first carrier board 203 located on is parallel to the front surface. It should be understood that the pitch angle of the front surface mentioned above and the pitch angle of the stacking structure can be set according to needs of the actual application scenarios.

For example, as shown in FIG. 1C and FIG. 1D and FIG. 1J and FIG. 1L, the time-of-flight camera module may further include a connection board 215, a second flexible circuit board 221 and a cable 4. For example, the connection board 215 is electrically connected with the first carrier board 203 by the second flexible circuit board 211; the cable 4 is electrically connected with the connection board 215, and the cable 4 is configured to be connected with at least one of an external power supply and an external device (for example, PC). For example, the connection board 215 is configured for transferring of power signals and data transmission signals, etc.

For example, as shown in FIG. 1L, the structure support 304 includes a fourth opening and a limit ring 310, the limit ring 310 is located on a side of the structure support 304 away from the first carrier board 203. The second flexible circuit board 221 is lapped to a side of the first carrier board 203 close to the structure support 304, and bends and passes through the fourth opening and the limit ring 310. The fourth opening and the limit ring 310 on the structure support 304 are conducive to a mass production stability of an assembly position of the second flexible circuit board 221, and a moving amount is reduced by the limit in actual use, and a risk of shedding of the second flexible circuit board 221 caused by vibration in actual use is reduced.

For example, as shown in FIG. 1M, the back housing 5 includes a fifth opening (in FIG. 1D, blocked by a back housing blocking cover 6), the connection board 215 is fixed to the back housing 5 and corresponds to the fifth opening; the cable 4 is electrically connected with the connection board 215 through the fifth opening. For example, in some examples, the cable 4 may include a power supply line and a data line for providing power supply and data transmission, respectively; the connection board 215 may be connected with the external power supply and the external device (for example, PC) by the cable 4.

Figure 1N:
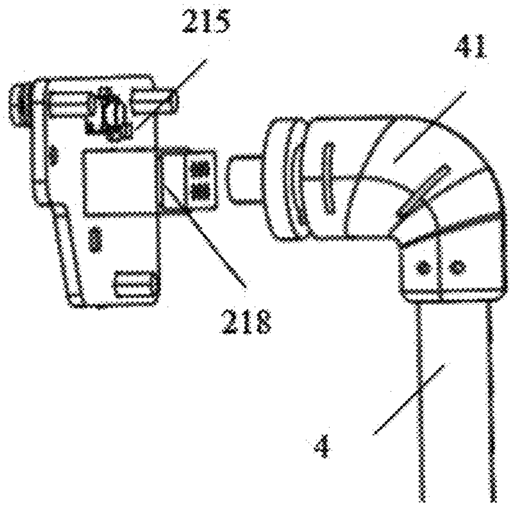
FIG. 1N is a schematic diagram of connection between a connection board and a cable of a time-of-flight camera module provided by some embodiments of the present disclosure.

For example, as shown in FIG. 1N, the connection board 215 has a cable interface 218, and the cable 4 is electrically connected with the cable interface 218. A bending portion of the cable 4 is wrapped with a bending protection portion 41, the bending protection portion 41 is configured to protect the bending portion of the cable 4 to extend service life of the cable 4.

For example, as shown in FIG. 1D, the time-of-flight camera module may further include a back housing blocking cover 6. For example, the back housing blocking cover 6 is a hollow structure, the cable 4 passes through the hollow structure and is electrically connected with the connection board 215. The back housing blocking cover 6 is configured to block the fifth opening mentioned above; at the same time, the back housing blocking cover 6 can further fix and protect the cable 4 additionally, and a rapid replacement of the cable 4 can be completed by removing the back housing blocking cover 6.

For example, as shown in FIG. 1D, the back housing blocking cover 6 further comprises a module mounting portion 7, the module mounting portion 7 is configured to mount and fix the time-of-flight camera module to a top of some equipment (for example, a display device to be introduced later) or directly above some equipment door (for example, elevator door, refrigerator door, and so on). For example, as shown in FIG. 1D, the module mounting portion 7 may be located on both sides of the back housing blocking cover 6. For example, as shown in FIG. 1D, the module mounting portion 7 may protrude from the back surface of the back housing 5. For example, as shown in FIG. 1D, the module mounting portion 7 may include a mounting board 71. For example, the mounting board 71 is perpendicular or substantially perpendicular to the back surface of the back housing 6, an extension direction of the mounting board 71 may be the same as an extension direction of the back surface of the back housing 5, and the mounting board 71 has a plurality of through vias for fixing and/or limiting, so as to facilitate mounting and fixation of the time-of-flight camera module. For example, as shown in FIG. 1D, the module mounting portion 7 may further include a reinforcement portion 72 connected to the mounting board 71 to improve strength of the module mounting portion. For example, the reinforcement 72 may be arranged vertically or substantially perpendicular to the back surface of the back housing 6, and perpendicular or substantially perpendicular to the mounting board 71. For example, as shown in FIG. 1D, each module mounting portion 7 may include two reinforcement portions 72, but is not limited to this; For example, a number of the reinforcement portions 72 in each module mounting portion 7 may also be one (as shown in FIG. 38) or more, and embodiments of the present disclosure are not limited to this. It should be noted that the embodiments of the present disclosure do not limit a specific shape and structure of the module mounting portion 7, as long as the mounting and fixation of the time-of-flight camera module can be realized.

For example, in some embodiments, the first infrared laser emission unit and the second infrared laser emission unit both include a vertical cavity surface emitting laser (Vertical-Cavity Surface-Emitting Laser, VCSEL) and a beam expander. A vertical cavity surface emitting laser is a semiconductor laser, and laser can be emitted from its top surface. For example, common infrared laser emission wavelength is 850 nm, 940 nm and so on. For example, the beam expander generally includes a beam expansion lens or a diffuser.

In order to meet the requirements of the ultra-wide angle and long distance-range detection, the infrared laser emission unit of the time-of-flight camera module needs to cover a wide-angle range. For example, in some embodiments, a horizontal emission angle of the vertical cavity surface emitting laser is greater than or equal to 95°, for example, the horizontal emission angle is 100°, 110° or 120° and so on; a vertical emission angle of the vertical cavity surface emitting laser is greater than or equal to 75°, for example, the vertical emission angle is 80°, 85° or 90° and so on. Correspondingly, in order to meet the requirements of the ultra-wide angle and long distance-range detection, the lens 205 of the time-of-flight camera module needs to use an ultra-wide-angle lens to collect infrared light. For example, in some embodiments, a horizontal field of view of the lens 205 is greater than 100° and a vertical field of view of the lens 203 is greater than 80°. It should be understood that, in order to achieve better performance, the lens 205 may have characteristics of large relative aperture, low distortion and high resolution, so as to meet a requirement of a Modulation Transfer Function (MTF) of a high-resolution ToF Sensor. Further, in practical applications, the emission angle of the infrared laser emission unit is generally close to the field of view of the lens, that is, a horizontal emission angle of the vertical cavity surface emitting laser is close to the horizontal field of view of the lens 205, and a vertical emission angle of the vertical cavity surface emitting laser is close to the vertical field of view of the lens 205. It should be further understood that a ratio of the horizontal field of view of the lens 205 to the vertical field of view is generally similar to a horizontal/vertical ratio of the TOF Sensor resolution.

In practical applications, laser intensity of a single infrared laser emission unit is generally difficult to meet detection needs of a medium and long distance target object (energy density of infrared light reflected by the medium and long distance target object is too low), which results that a detection of the medium and long distance target object is susceptible to interference and poor accuracy of information collection. In this case, it can be considered to enhance emission power of the single infrared laser emission unit to meet the detection needs of the medium and long distance target object, but practicality of this scheme is poor. On the one hand, in the case that the emission power of the single infrared laser emission unit is too strong (for example, beyond its conventional working capacity), then its heat generation is generally serious and concentrated, and a resulting heat dissipation problem is not conducive to a compact design of the time-of-flight camera module; on the other hand, the emission power of the single infrared laser emission unit being too strong may cause harm to human eyes in practical applications, so it is likely that it will not pass a human eye safety certification. To solve the above problems, in the time-of-flight camera module provided in the embodiments of the present disclosure, two or more infrared laser emission units may be used. It should be noted that only a time-of-flight camera module comprising two infrared laser emission units is shown in drawings by example, but should not be considered as a limitation on the present disclosure.

In the case of using a plurality of infrared laser emission units to enhance the laser intensity, it is necessary to ensure that laser projection surfaces of a plurality of infrared laser emission units cover the field of view of the lens 205 (for example, a corresponding region of the angle of view of the lens 205). For example, an effective detection region is an overlapping region of the laser projection surfaces of the infrared laser emission units (as shown in FIG. 2A). At the medium and long distance, a non-overlapping region (for example, a dispersion region, as shown in FIG. 2A) illuminated by the plurality of infrared laser emission units will be small. Taking two infrared laser emission units having the same emission angle as an example, in the case that a distance between the centers of the two infrared laser emission units is d, in a long-distance state, a total size of the dispersion regions in a direction parallel to a line connecting the centers of the first infrared laser emission unit 201 and the second infrared laser emission unit 202 is only 2d. Because a spacing between the placement positions of the vertical cavity surface emitting lasers is a centimeter-level spacing, so that in the long-distance state, emission light of the two infrared laser emission units can basically achieve effective overlapping. Therefore, in a structure design of the time-of-flight camera module, it should be focused that the first cover board 2 can make the infrared light emitted by the two infrared laser emission units be effectively emitted.

For example, in some embodiments, as shown in FIG. 2A and FIG. 2B, a distance AB between the centers of the first infrared laser emission unit 201 and the second infrared laser emission unit 202 (A, B respectively represents a center of the two infrared laser emission units) is d, a distance the first infrared laser emission unit 201 or the second infrared laser emission unit 202 to the first cover board 2 (as shown in black thick solid line in FIG. 2A) is both h, the horizontal emission angle of the first infrared laser emission unit 201 and the second infrared laser emission unit 202 is both a, the vertical emission angle of the first infrared laser emission unit 201 and the second infrared laser emission unit 202 is both b, then a size c1 of the first cover board 2 in the direction parallel to the line connecting the centers of the first infrared laser emission unit 201 and the second infrared laser emission unit 202 and a size c2 of the first cover board 2 in the direction perpendicular to the line connecting the centers of the first infrared laser emission unit 201 and the second infrared laser emission unit 202 respectively satisfy the following formula: $c1>2h*\tan(a/2)\div d$, $c2>2h*\tan(b/2)$.

In the case of using a plurality of infrared laser emission units, a very small phase difference may exist between the infrared light emitted by each of the infrared laser emission units, therefore a distance between the infrared laser emission units should be as small as possible under a premise of ensuring good heat dissipation and not affecting a routing layout of the printed circuit board. For example, in some embodiments, the distance d between the centers of the first infrared laser emission unit 201 and the second infrared laser emission unit 202 is 15-30 mm, for example, 20 mm and the like. For example, in some embodiments, the distance between the centers of the second infrared laser emission unit 202 and the lens 205 is 20-60 mm. For example, the size of the first infrared laser emission unit 201 and the second infrared laser emission unit 202 (for example, the vertical cavity surface emitting laser) is about 3-5 mm, and the diameter of the lens 205 is about 10-20 mm.

It should be understood that, in the embodiments of the present disclosure, in a comprehensive consideration of the size of the first infrared laser emission unit 201 and the second infrared laser emission unit 202, the diameter of the lens 205, the heat dissipation and the compact design and other factors, the distance between the centers of the first infrared laser emission unit 201 and the second infrared laser emission unit 202 and the distance between the centers of the second infrared laser emission unit 202 and the lens 205 may be set according to actual needs.

For example, in some embodiments, the maximum detection distance of the time-of-flight camera module may be 5-7 m. For example, in order to achieve the maximum detection distance described above, as well as take into account the human eye safety certification, the emission power of the first infrared laser emission unit 201 and the second infrared laser emission unit 202 (for example, vertical cavity surface emitting laser) may be set to, for example, 1~1.4 W, and embodiments of the present disclosure include but are not limited to this.

For example, in some embodiments, a mounting height of the time-of-flight camera module is H, the vertical field of view of the lens is $\alpha$, the lens pitch angle of the time-of-flight camera module is $\theta$, the detection distance range of the time-of-flight camera module is [L1, L2], and the detection height range of the time-of-flight camera module at a detection distance L1 is [h1, h2], and satisfies the following formula relationship: $\tan(\alpha/2-\theta)*L1+H>h2$, $H-\tan(\alpha/2+\theta)*L1<h1$. For example, in some examples, L1 is in a range from 0.3 m to 0.7 m, L2 is in a range from 5 m to 7 m, h1 is in a range from 1 m to 1.2 m, and h2 is in a range from 1.9 m to 2.3 m. It should be noted that embodiments of the present disclosure include, but are not limited to this. That is, the mounting height of the time-of-flight camera module H, the vertical field of view of the lens a, and the lens pitch angle $\theta$ of the time-of-flight camera module can be set according to the actual needs, so as to adjust the values of L1, h1 and h2. For example, the value of L2 is generally preset according to the detection needs, and then, the infrared laser emission unit with suitable emission power can be selected according to the value of L2. It should be noted that, at the detection distance L1, the time-of-flight camera module being able to detect objects (including human bodies, etc.) within the detection height range [h1, h2] or a part of the object within the detection height range [h1, h2], should be considered as that the time-of-flight camera module can detect presence of the object, but whether to perform counting (for example, counting the number of people) and other functions needs to be determined according to an algorithm design, the present disclosure does not limit this. It should be noted that the detection distances 1I and L2 are both horizontal distances.

Figure 3A:
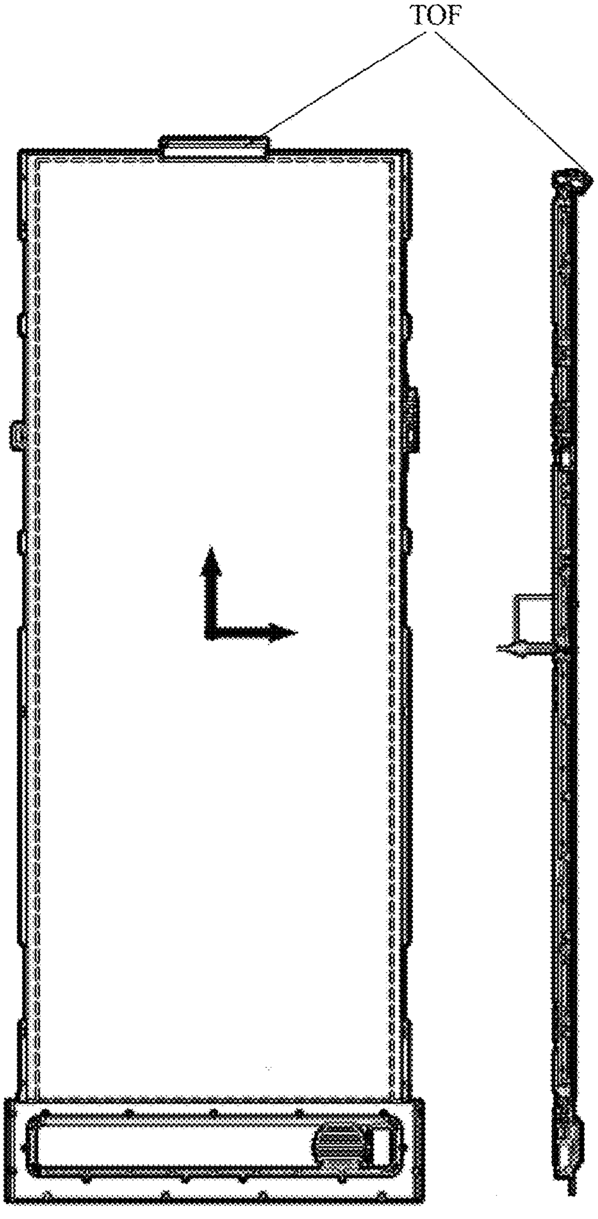
FIG. 3A is a schematic diagram of a mounting position of a time-of-flight camera module provided by some embodiments of the present disclosure.
Figure 3B:
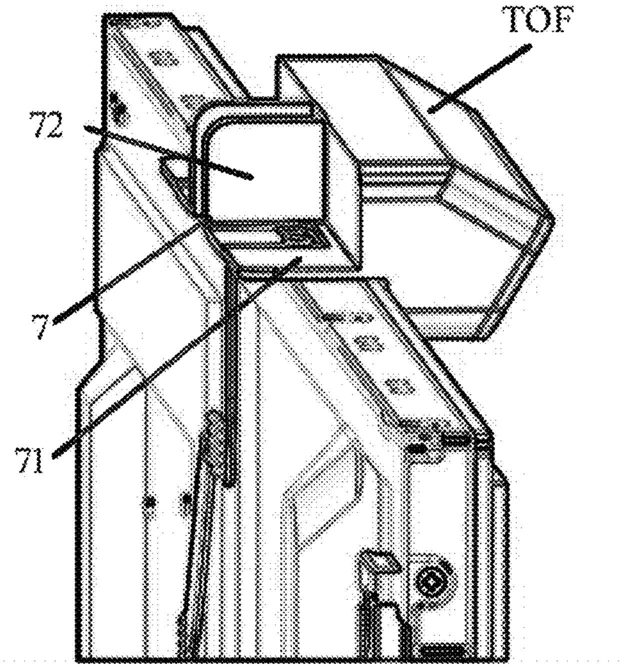
FIG. 3B is a schematic diagram showing the mounting of a time-of-flight camera module provided by some embodiments of the present disclosure.

For example, a working principle of the time-of-flight camera module provided in the embodiments of the present disclosure is roughly as follows: the infrared emission unit (the first infrared laser emission unit 201 and the second infrared laser emission unit 202) emits a laser pulse according to a predetermined modulation frequency, the laser pulse is projected through the infrared filter (for example, the first cover board 2 provided with an infrared coating) to the external environment, after being reflected by a target object in the external environment, the pulsed light enters the lens 205 through the infrared filter (for example, the second cover board 3 provided with an infrared coating), and enters the TOF Sensor through the lens 205; the depth information generated by the TOF Sensor is digitally processed and reaches the computational component, which can further process the depth information and interact with external devices. Some embodiments of the present disclosure further provide a time-of-flight camera module application method. For example, the time-of-flight camera module is a time-of-flight camera module provided by any one of the embodiments of the present disclosure, the time-of-flight camera module may be widely used in a variety of scenarios requiring object recognition and/or behavior detection while ensuring the privacy protection. FIG. 3A is a schematic diagram of a mounting position of a time-of-flight camera module provided by some embodiments of the present disclosure, FIG. 3B is a schematic diagram illustrating the mounting of a time-of-flight camera module provided by some embodiments of the present disclosure. For example, as shown in FIG. 3A and FIG. 31, the time-of-flight camera module may be mounted on the top of some equipment (for example, the display device to be introduced later) or directly above some equipment door (for example, elevator door, refrigerator door, and so on) by its module mounting portion, and the front surface of the front housing of the time-of-flight camera module faces the detection region, so that the time-of-flight camera module can identify and/or possess behavior detection on users of these devices or device doors, which can meet the needs of privacy protection at the hardware level.

Figure 4:
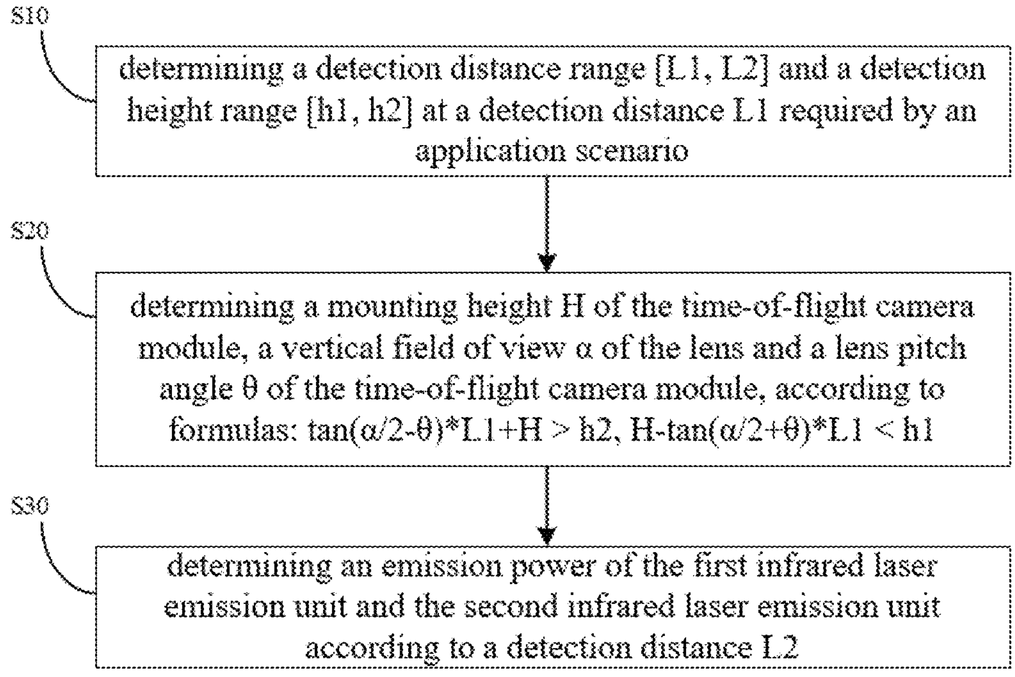
FIG. 4 is a flowchart of an application method of a time-of-flight camera module provided by some embodiments of the present disclosure.
Figure 5:
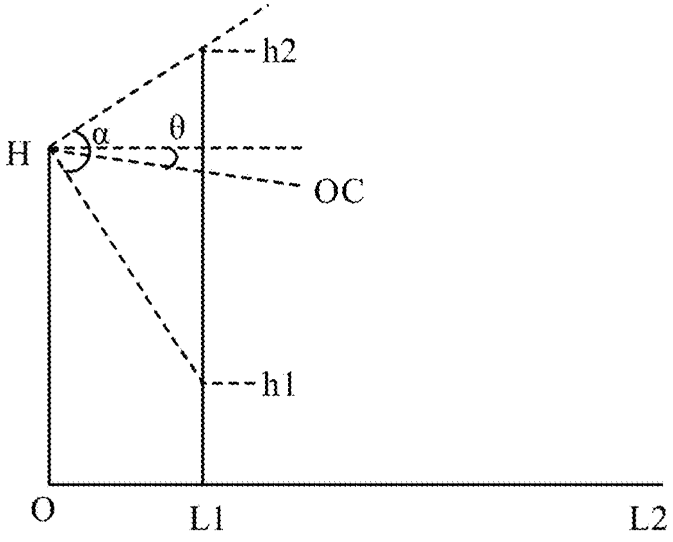
FIG. 5 is a side view of a detection region of a time-of-flight camera module provided by some embodiments of the present disclosure.
Figure 6:
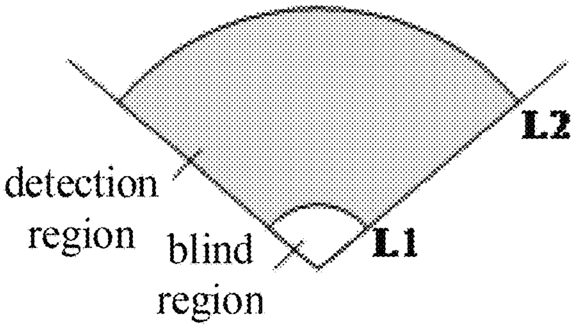
FIG. 6 is a top view of a detection region of a time-of-flight camera module provided by some embodiments of the present disclosure.

FIG. 4 is a flowchart of an application method of a time-of-flight camera module provided by some embodiments of the present disclosure; FIG. 5 is a side view of a detection region of the time-of-flight camera module provided by some embodiments of the present disclosure; FIG. 6 is a top view of a detection region of the time-of-flight camera module provided by some embodiments of the present disclosure. In the following, the application method shown in FIG. 4 is explained in detail with reference to FIG. 5 and FIG. 6.

For example, as shown in FIG. 4, the application method may include the following step S10 to step S30.

Step S10: determining a detection distance range [L1, L2] and a detection height range [h1, h2] at a detection distance L1 required by an application scenario.

For example, in some examples, L1 is in a range from 0.3 m to 0.7 m, L2 is in a range from 5 m to 7 m, h1 is in a range from 1 m to 1.2 m, and h2 is in a range from 1.9 m to 2.3 m. It should be noted that embodiments of the present disclosure include, but are not limited to this. That is, the values of L1, L2, h1, h2 can be set according to the actual needs.

Step S20: determining a mounting height H of the time-of-flight camera module, a vertical field of view α of the lens and a lens pitch angle θ of the time-of-flight camera module, according to formulas: $\tan(\alpha/2-\theta)*L1+H>h2$, $H-\tan(\alpha/2+\theta)*L1<h1$.

For example, the mounting height H of the time-of-flight camera module, the vertical field of view α of the lens and the lens pitch angle θ of the time-of-flight camera module can refer to FIG. 5.

It should be understood that the lens pitch angle θ of the time-of-flight camera module is the pitch angle of the front surface mentioned above, that is, the pitch angle of the stacking structure mentioned above.

The mounting height of the time-of-flight camera module, the vertical field of view α of the lens and the lens pitch angle θ of the time-of-flight camera module determined in step S20 can ensure that, at a detection distance L1, the time-of-flight camera module can detect the object (including human bodies, etc.) located in the detection height range [h1, h2] or a part of the object located within the detection height range [h1, h2].

Step S30: determining an emission power of the first infrared laser emission unit and the second infrared laser emission unit according to a detection distance L2.

It should be understood that the emission power of the first infrared laser emission unit and the second infrared laser emission unit should meet the needs of the detection distance range reaching the detection distance L2, and at the same time further taking into account the human eye safety certification. Therefore, the detection distance L2 is generally and reasonably set according to the actual application scenarios. For example, an infrared laser emission unit with a suitable emission power can be selected according to the value of L2 after setting the value of L2 according to the actual application scenarios.

For example, as shown in FIG. 6, the detection region of the time-of-flight camera module is located in a sector region with a radius of L2, and a central angle of the sector region with the radius of L2 is close to or equal to the horizontal field of view of the lens. For example, the sector region with the radius of L2 includes a blind region and a detection region, wherein the blind region is a radius region with a radius of L1, and a person with a height not exceeding h1 and in the blind region cannot be detected by the time-of-flight camera module; the detection region is a region in the sector region with the radius of L2 except for the blind region, and the sector region with the radius of L1 has the same central angle as the sector region with the radius of L2.

In practical applications, suitable time-of-flight camera modules can be manufactured or selected according to parameters determined in step S20 and step S30 above to adapt to a variety of different application scenarios.

Figure 7:
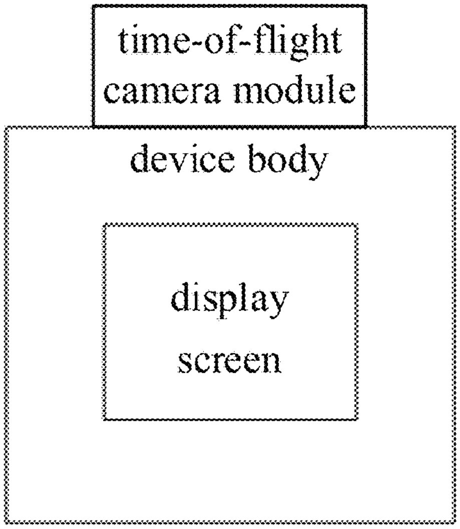
FIG. 7 is a schematic block diagram of a display device provided in some embodiments of the present disclosure.

Some embodiments of the present disclosure further provide a display device. FIG. 7 is a schematic block diagram of a display device provided in some embodiments of the present disclosure. For example, as shown in FIG. 7, the display device comprises a device body and a time-of-flight camera module provided by any one of embodiments of the present disclosure. For example, the time-of-flight camera module is arranged on top of the device body, for example, the mounting and configuration of the time-of-flight camera module may refer to relevant descriptions of the application method described above, and will not be repeated herein.

For example, as shown in FIG. 7, the device body may include a display screen. For example, the display screen can display advertising content or product information. For example, the display screen may be a touch screen, embodiments of the present disclosure include, but are not limited to this. For example, the display screen may include an LCD display screen, an OLED display screen and so on, embodiments of the present disclosure are not limited to this.

For example, in some embodiments, the time-of-flight camera module is configured to detect whether a person is in a predetermined detection region; the display screen is configured to display advertising content in the case that no person is in the predetermined detection region, and to display product information in the case that a person is in the predetermined detection region. In this case, the display device may be, for example, a container machine and so on, the time-of-flight camera module realizes a function of a distance sensor. Because a placement position of the container machine is fixed, a field of view of a front-placed time-of-flight camera module is determined, and the predetermined detection region can be freely set in the sector region corresponding to the detection distance L2 mentioned above (hereinafter referred to as a "maximum detection region"). Because the TOF Sensor can directly output distance information, therefore, a human body profile (such as a whole body profile or an upper body profile of the human body, and so on, but is not limited to this) may be taken as a basis for judgment, with the ground as a reference, human body behavior trajectory may be tracked after the human body is identified in the maximum detection region. In the case that the human body enters the predetermined detection region, switch display pictures in the display screen, for example, from the advertising content to the product information; in the case that the human body leaves the predetermined detection region, it is possible to switch the display pictures in the display screen, for example, from the product information to the advertising content. It should be understood that, because the upper body profile can be used as the basis for judgment, therefore, for an adult with a normal height (for example, greater than the aforementioned h1), even if it is located in the aforementioned blind region (as shown in FIG. 6), it can generally be identified and detected. Therefore, the predetermined detection region may further generally include the aforementioned blind region, the following embodiments are similar to this, and will not be repeated in detail.

For example, in other embodiments, the display screen is configured to display advertising content; the time-of-flight camera module is configured to: detect whether a person is in the predetermined detection region; in the case that a person is in the predetermined detection region, provide an independent identification for each person in the predetermined detection region, and track each person, perform statistic on dwelling time of each person in the predetermined detection region; and in the case that the dwelling time is greater than a threshold, increase an amount of advertising reading by 1; further, perform no double counting on the amount of advertising reading in the case that the independent identification disappears and appears repeatedly within a specified time interval. In this case, the display device may be, for example, an advertising machine and the like.

For example, a human body detection logic can be as follows: 1) in the case that the display device is in operation, a background depth image is firstly acquired through the time-of-flight camera module; of course, the background depth image can further be taken in advance; 2) then, depth images are continuously acquired through the time-of-flight camera module, which can be compared with the background depth image to filter out newly emerging individuals in the predetermined detection region; wherein the human body characteristics (for example, the human body profile, such as the whole body profile or the upper body profile, and so on, but is not limited to this) can be used as sifting criteria; 3) the individual is marked and tracked in the case of determining that it meets the human body characteristics and track it. For example, a counting logic can be as follows: determining whether a count has been made for the individual; in the case of being counted, it is continuously tracked until it walks out of the predetermined detection region (for example, disappearing from the predetermined detection region for more than a certain period of time, for example, disappearing from the predetermined detection region for more than 1 s, but is not limited to this), and recorded information of the individual is removed; in the case of being not counted, the individual is continuously tracked, and timing is started as the individual stops moving in the predetermined detection region, and in the case that the dwelling time of the individual is greater than the threshold (for example, 3 s, but is not limited to this), the count is increased by 1 (for example, the advertising reading amount is increased by 1), and the individual is continuously tracked until it walks out of the predetermined detection region.

In practice, a definition of an effective advertising reading amount may be based on customer needs. For example, in one specific example, an effective advertising reading may be a matter that meets the following conditions: 1) a person is in the predetermined detection region; 2) the person stays in the predetermined detection region for at least 3 s; 3) no repeated counting in the case that the person moves in the predetermined detection region. To avoid the repeated counting in a short period of time, it is necessary to track the behavior trajectory of a person entering the predetermined detection region.

For example, in practice, a detection method may include: starting tracking after detecting a human body in a predetermined detection region, and then performing statistic of individual's dwelling time in the predetermined detection region, in the case that the dwelling time in the region exceeds 3 s, then counting according to the individual; after counting for the individual, tracking the behavior trajectory continuously, and performing no repeated counting in the case that a counted individual moves in the predetermined detection region. According to a working principle of ToF, a human body which is shielded cannot be recognized, but in the case that the human body re-enters the field of view of the time-of-flight camera module from a shielding state, a detection algorithm may re-perform a counting operation, and thus may causing some wrong counting. In order to improve a detection accuracy, each detection of individual (for example, a detected individual) in the field of view of the time-of-flight camera module can be provided with an independent identification (for example, an independent ID), and an individual who suddenly disappears and reappears in the field of view of the time-of-flight camera module can be determined to be the same person, so that the counting cannot be repeated at least within a certain time range. In particular, for individuals located in the blind region and near the blind region of the time-of-flight camera module, the upper body can generally be detected, therefore, in order to increase a detection range, at an algorithm level, a human body judgment standard of an individual in the blind region and near the blind region can be set to the upper body profile, so that the depth information obtained by the time-of-flight camera module is sufficient for human detection. In this case, a person who enters a close-distance detection range from a side of the display device can be counted.

Figure 8:
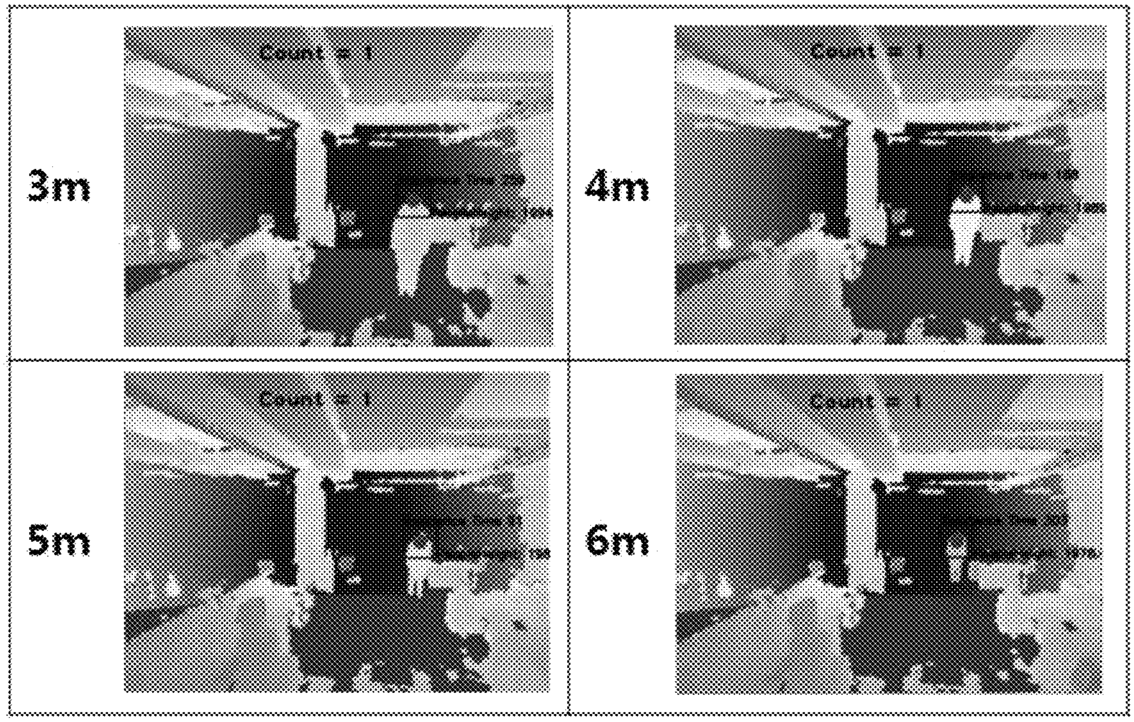
FIG. 8 is an exemplary diagram of detection effect of a display device provided by some embodiments of the present disclosure.

FIG. 8 is an example diagram of detection effect of a display device provided by some embodiments of the present disclosure. Four sub-graphs in FIG. 8 show detection patterns with a detection distance of 3 m, 4 m, 5 m, and 6 m, respectively, and the number of persons and distance information in the field of view can be displayed in real time in the detection patterns. For example, in order to conduct more accurate behavior analysis and statistics, variables involved in the detection algorithm may include: the number of current individuals in the field of view, a total statistics number of the individuals, total activity time of the current individuals in the field of view, the dwelling time of the current individuals in the field of view, the independent identification of the current individuals (independent ID) and the like.

For example, the predetermined detection region may be freely set within the sector region corresponding to the aforementioned detection distance L2 (hereinafter referred to as the "maximum detection region"). For example, the threshold and the specified time interval mentioned above may be set according to actual needs, embodiments of the present disclosure are not limited to this. For example, a mounting height of the time-of-flight camera module and the pitch angle of the lens can also be set according to actual needs to adapt to a variety of different application scenarios.

The time-of-flight camera module in the display device provided by embodiments of the present disclosure may meet requirements of reducing blind regions in complex and diverse environments, and can perform a wider range of coverage and detection. The time-of-flight camera module is used in the display device, instead of the RGB camera, so that the human body tracking statistics and a real-time distance feedback can be effectively carried out through the detection algorithm under a premise of meeting the privacy protection.

It should be noted that the display device provided by the embodiments of the present disclosure are exemplary and not restrictive, according to the needs of actual applications, the display device may further include other conventional components or structures, for example, to achieve necessary functions of the display device, those skilled in the art may provide other conventional components or structures according to the specific application scenarios, and embodiments of the present disclosure are not limited to this.

The Following Statements should be Noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments of the present disclosure can be combined.

The above are only the specific embodiments of the disclosure, but the scope of protection of the disclosure is not limited to this. Any person skilled in the technical field who can easily think of changes or replacements within the scope of the disclosure should be covered in the protection scope of the disclosure. Therefore, the protection scope of the disclosure shall be subject to the protection scope of the claims.

What is claimed is:

1. A time-of-flight camera module, comprising: a first carrier board, a second carrier board, a structure support, an infrared laser emission unit, a lens and a time-of-flight sensor, wherein the first carrier board, the structure support and the second carrier board are stacked, and the first carrier board and the second carrier board are fixed on both sides of the structure support, respectively, the infrared laser emission unit is arranged on a side of the first carrier board away from the structure support, the first carrier board comprises a lens via hole located on a side of the infrared laser emission unit, the structure support comprises a support via hole corresponding to the lens via hole, and the lens passes through the support via hole, the time-of-flight sensor is arranged on the second carrier board and is configured to sense infrared light collected by the lens to generate depth information, the time-of-flight camera module further comprises: a computational component, and the computational component is arranged on the first carrier board.

2. The time-of-flight camera module according to claim 1, further comprising: a housing, wherein the structure support comprises a plurality of wedges, the housing comprises wedge mounting portions corresponding to the plurality of wedges one to one, and the structure support is fixed to the housing by matching of the plurality of wedges and the plurality of wedge mounting portions.

3. The time-of-flight camera module according to claim 1, wherein the infrared laser emission unit comprises a first infrared laser emission unit and a second infrared laser emission unit, the first infrared laser emission unit and the second infrared laser emission unit are arranged side by side on the side of the first carrier board away from the structure support, the lens via hole is located on a side of the second infrared laser emission unit away from the first infrared laser emission unit.

4. The time-of-flight camera module according to claim 3, wherein an orthographic projection of a center of the first infrared laser emission unit on the first carrier board, an orthographic projection of a center of the second infrared laser emission unit on the first carrier board and an orthographic projection of a center of the lens on the first carrier board are located on a same straight line.

5. The time-of-flight camera module according to claim 3, further comprising: a front housing, wherein the front housing comprises a front surface, the front surface comprises a first groove and a second groove recessing in a direction towards the structure support;

the first groove comprises a first opening corresponding to the first infrared laser emission unit and a second opening corresponding to the second infrared laser emission unit, the second groove comprises a third opening corresponding to the lens;

the time-of-flight camera module further comprises a first filter covering the second groove, and the first filter is configured to allow infrared light having wavelength the same as that of infrared light emitted by the first infrared laser emission unit and the second infrared laser emission unit to pass through.

6. The time-of-flight camera module according to claim 5, further comprising: a second filter covering the first groove, and the second filter is configured to allow infrared light having wavelength the same as that of infrared light emitted by the first infrared laser emission unit and the second infrared laser emission unit to pass through.

7. The time-of-flight camera module according to claim 6, wherein a distance between centers of the first infrared laser emission unit and the second infrared laser emission unit is d, a distance from the first infrared laser emission module to the second filter and a distance from the second infrared laser emission unit to the second filter are both h, a horizontal emission angle of the first infrared laser emission unit and a horizontal emission angle of the second infrared laser emission unit are both a, and a vertical emission angle of the first infrared laser emission unit and a vertical emission angle of the second infrared laser emission unit are both b, a size c1 of the second filter in a direction parallel to a line connecting centers of the first infrared laser emission unit and the second infrared laser emission unit and a size c2 of the second filter in a direction perpendicular to the line connecting centers of the first infrared laser emission unit and the second infrared laser emission unit satisfy the following formula, respectively:

$$c1 > 2\,h*\tan(a/2) + d,\ c2 > 2\,h*\tan(b/2).$$

8. The time-of-flight camera module according to claim 3, wherein the first infrared laser emission unit and the second infrared laser emission unit each comprises a vertical cavity surface emitting laser and a beam expander, the vertical cavity surface emitting laser has an emission power in a range from 1 W to 1.4 W, a horizontal emission angle of the vertical cavity surface emitting laser is greater than or equal to 95°, and a vertical emission angle of the vertical cavity surface emitting laser is greater than or equal to 75°, a maximum detection distance of the time-of-flight camera module is in a range from 5 m to 7 m.

9. The time-of-flight camera module according to claim 1, further comprising: a connection board, a second flexible circuit board and a cable, wherein the connection board is electrically connected with the first carrier board by the second flexible circuit board, the cable is electrically connected with the connection board, and the cable is configured to be connected with at least one of an external power supply and an external device.

10. The time-of-flight camera module according to claim 9, wherein the structure support further comprises a fourth opening and a limit ring, the limit ring is located on a side of the structure support away from the first carrier board, the second flexible circuit board bends and passes through the fourth opening and the limit ring.

11. The time-of-flight camera module according to claim 9, further comprising: a back housing and a back housing blocking cover, wherein the back housing comprises a fifth opening, the connection board is fixed to the back housing and corresponds to the fifth opening;

the back housing blocking cover is configured to block the fifth opening, the back housing blocking cover is a hollow structure, and the cable passes through the hollow structure to be connected with the connection board.

12. The time-of-flight camera module according to claim 1, comprising: a front housing and a back housing, wherein the back housing comprises a back surface, and is fixed with the front housing by the back surface to achieve a whole machine coverage;

the front housing comprises a front surface which is inclined relative to the back surface, and a value range of an inclination angle of the front surface relative to the back surface is [20°, 40°].

13. The time-of-flight camera module according to claim 1, further comprising: an infrared laser circuit module and a housing, wherein the infrared laser circuit module is arranged on the side of the first carrier board away from the structure support;

thermal adhesive is provided on a side of the infrared laser circuit module away from the first carrier board, and is configured to be in contact with the housing, and a material of the housing comprises metal.

14. The time-of-flight camera module according to claim 1, further comprising: a first flexible circuit board, wherein the first carrier board and the second carrier board are both printed circuit boards, and the first carrier board is electrically connected with the second carrier board by the first flexible circuit board.

15. The time-of-flight camera module according to claim 1, wherein the computational component is configured to determine at least one of a number, a distance, a total activity time, and dwelling time of human body in a field of view of the time-of-flight camera module and provide an identification for the human body in the field of view of the time-of-flight camera module according to the depth information.

16. The time-of-flight camera module according to claim 1, wherein a horizontal field of view of the lens is greater than 100°, and a vertical field of view of the lens is greater than 80°.

17. The time-of-flight camera module according to claim 1, wherein a mounting height of the time-of-flight camera module is H, a vertical field of view of the lens is $\alpha$, a pitch angle of the lens of the time-of-flight camera module is $\theta$, a detection distance range of the time-of-flight camera module is [L1, L2], a detection height range of the time-of-flight camera module at a detection distance L1 is [h1, h2], and the time-of-flight camera module satisfies the following relationship formula: $\tan(\alpha/2-\theta)*L1+H>h2$, $H-\tan(\alpha/2+\theta)*L1<h1$.

18. A display device, comprising: a device body and the time-of-flight camera module according to claim 1, wherein the time-of-flight camera module is arranged on a top of the device body, and the device body comprises a display screen.

19. The display device according to claim 18, wherein the time-of-flight camera module is configured to detect whether a person is in a predetermined detection region, the display screen is configured to display advertising content in the case that no person is in the predetermined detection region, and display product information in the case that a person is in the predetermined detection region.

20. The display device according to claim 18, wherein the display screen is configured to display advertising content;

the time-of-flight camera module is configured to:

detect whether there is a person in the predetermined detection region, in the case that a person is in the predetermined detection region, provide an independent identification for each person in the predetermined detection region, track each person, and proceed statistics of dwelling time of each person in the predetermined detection region; and, in the case that the dwelling time is greater than a threshold, increase an advertising reading amount by 1; and in the case that the independent identification disappears and appears repeatedly, proceed no repeated counting for the advertising reading amount.

* * * * *